(12) United States Patent
D'Amato

(10) Patent No.: US 11,405,439 B2
(45) Date of Patent: Aug. 2, 2022

(54) HYBRID SNIFFING AND REBROADCAST FOR BLUETOOTH NETWORKS

(71) Applicant: Sonos, Inc., Santa Barbara, CA (US)

(72) Inventor: Nicholas D'Amato, Santa Barbara, CA (US)

(73) Assignee: Sonos, Inc., Santa Barbara, CA (US)

(*) Notice: Subject to any disclaimer, the term of this patent is extended or adjusted under 35 U.S.C. 154(b) by 0 days.

(21) Appl. No.: 17/347,186

(22) Filed: Jun. 14, 2021

(65) Prior Publication Data

US 2022/0078219 A1 Mar. 10, 2022

Related U.S. Application Data

(63) Continuation of application No. 16/811,105, filed on Mar. 6, 2020, now Pat. No. 11,038,937.

(51) Int. Cl.
| | |
|---|---|
| *H04L 29/06* | (2006.01) |
| *H04L 65/611* | (2022.01) |
| *H04L 65/65* | (2022.01) |
| *H04L 65/80* | (2022.01) |
| *H04W 4/80* | (2018.01) |
| *H04W 56/00* | (2009.01) |
| *H04W 84/18* | (2009.01) |
| *H04B 17/318* | (2015.01) |

(52) U.S. Cl.
CPC ....... *H04L 65/4076* (2013.01); *H04B 17/318* (2015.01); *H04L 65/608* (2013.01); *H04L 65/80* (2013.01); *H04W 4/80* (2018.02); *H04W 56/001* (2013.01); *H04W 84/18* (2013.01)

(58) Field of Classification Search
CPC ... H04L 65/4076; H04L 65/608; H04L 65/80; H04B 17/318; H04W 4/80; H04W 56/001; H04W 4/18
USPC ......................................................... 709/231
See application file for complete search history.

(56) References Cited

U.S. PATENT DOCUMENTS

| | | |
|---|---|---|
| 5,440,644 A | 8/1995 | Farinelli et al. |
| 5,761,320 A | 6/1998 | Farinelli et al. |
| 5,923,902 A | 7/1999 | Inagaki |
| 6,032,202 A | 2/2000 | Lea et al. |
| 6,256,554 B1 | 7/2001 | DiLorenzo |
| 6,404,811 B1 | 6/2002 | Cvetko et al. |
| 6,469,633 B1 | 10/2002 | Wachter |
| 6,522,886 B1 | 2/2003 | Youngs et al. |
| 6,611,537 B1 | 8/2003 | Edens et al. |
| 6,631,410 B1 | 10/2003 | Kowalski et al. |
| 6,757,517 B2 | 6/2004 | Chang |

(Continued)

FOREIGN PATENT DOCUMENTS

| | | |
|---|---|---|
| EP | 1389853 A1 | 2/2004 |
| WO | 200153994 | 7/2001 |

(Continued)

OTHER PUBLICATIONS

AudioTron Quick Start Guide, Version 1.0, Mar. 2001, 24 pages.

(Continued)

*Primary Examiner* — Hamza N Algibhah
(74) *Attorney, Agent, or Firm* — Akerman LLP

(57) ABSTRACT

Disclosed herein are playback devices, groups of playback devices, and methods of operating playback devices and groupings thereof configured for hybrid sniffing and rebroadcast for networks, including Bluetooth networks.

20 Claims, 17 Drawing Sheets

(56) References Cited

U.S. PATENT DOCUMENTS

| | | | |
|---|---|---|---|
| 6,778,869 B2 | 8/2004 | Champion | |
| 7,130,608 B2 | 10/2006 | Hollstrom et al. | |
| 7,130,616 B2 | 10/2006 | Janik | |
| 7,143,939 B2 | 12/2006 | Henzerling | |
| 7,236,773 B2 | 6/2007 | Thomas | |
| 7,295,548 B2 | 11/2007 | Blank et al. | |
| 7,324,857 B2* | 1/2008 | Goddard | H04N 21/4392 700/94 |
| 7,391,791 B2 | 6/2008 | Balassanian et al. | |
| 7,483,538 B2 | 1/2009 | McCarty et al. | |
| 7,571,014 B1 | 8/2009 | Lambourne et al. | |
| 7,630,501 B2 | 12/2009 | Blank et al. | |
| 7,643,894 B2 | 1/2010 | Braithwaite et al. | |
| 7,657,910 B1 | 2/2010 | McAulay et al. | |
| 7,853,341 B2 | 12/2010 | McCarty et al. | |
| 7,987,294 B2 | 7/2011 | Bryce et al. | |
| 8,014,423 B2 | 9/2011 | Thaler et al. | |
| 8,045,952 B2 | 10/2011 | Oureshey et al. | |
| 8,103,009 B2 | 1/2012 | McCarty et al. | |
| 8,234,395 B2 | 7/2012 | Millington | |
| 8,483,853 B1 | 7/2013 | Lambourne | |
| 8,942,252 B2 | 1/2015 | Balassanian et al. | |
| 9,798,515 B1* | 10/2017 | Mendes | H04N 21/8106 |
| 9,940,091 B2* | 4/2018 | Beckhardt | H04N 21/8113 |
| 10,209,947 B2* | 2/2019 | Morganstern | G06F 3/165 |
| 10,425,753 B2* | 9/2019 | Gossain | H04W 16/14 |
| 10,679,673 B2* | 6/2020 | Møller | H04N 21/8547 |
| 10,681,463 B1* | 6/2020 | Beckhardt | H04N 21/43072 |
| 10,884,973 B2* | 1/2021 | Kakulamarri | G06F 3/162 |
| 11,082,770 B2* | 8/2021 | Kallai | H04R 27/00 |
| 2001/0042107 A1 | 11/2001 | Palm | |
| 2002/0022453 A1 | 2/2002 | Balog et al. | |
| 2002/0026442 A1* | 2/2002 | Lipscomb | H04N 21/632 |
| 2002/0124097 A1 | 9/2002 | Isely et al. | |
| 2003/0157951 A1 | 8/2003 | Hasty, Jr. | |
| 2004/0024478 A1 | 2/2004 | Hans et al. | |
| 2007/0142944 A1 | 6/2007 | Goldberg et al. | |
| 2009/0168935 A1* | 7/2009 | Stanton | H04J 3/0638 375/356 |
| 2015/0023204 A1* | 1/2015 | Wik | H02J 50/10 370/254 |
| 2015/0081068 A1* | 3/2015 | Cheng | H04N 21/436 700/94 |
| 2016/0150501 A1* | 5/2016 | Hui | H04W 4/06 370/254 |
| 2016/0157016 A1* | 6/2016 | Chamness | H04R 3/04 381/98 |
| 2016/0227319 A1* | 8/2016 | Zhao | H04R 27/00 |
| 2017/0055179 A1* | 2/2017 | Radunovic | H04L 5/0096 |
| 2017/0142535 A1* | 5/2017 | Aggarwal | H04R 5/04 |
| 2017/0171577 A1* | 6/2017 | Kipp | H04N 21/4825 |
| 2017/0286051 A1* | 10/2017 | Mendes | G06F 3/165 |
| 2018/0049145 A1* | 2/2018 | Daley | H04W 56/0015 |
| 2018/0367839 A1* | 12/2018 | Vandoros | H04N 21/435 |
| 2019/0096384 A1* | 3/2019 | Sereshki | G06F 3/165 |
| 2019/0149874 A1* | 5/2019 | Lau | H04N 21/44004 725/74 |
| 2019/0304507 A1* | 10/2019 | Leyfman | G06F 3/165 |
| 2019/0394597 A1* | 12/2019 | Aggarwal | H04R 5/04 |
| 2020/0092515 A1* | 3/2020 | Stern | H04N 21/4112 |
| 2020/0367006 A1* | 11/2020 | Beckhardt | H04R 5/04 |

FOREIGN PATENT DOCUMENTS

| | | | | |
|---|---|---|---|---|
| WO | 2003093950 A2 | 11/2003 | | |
| WO | 2007034386 A2 | 3/2007 | | |
| WO | WO-2007034386 A2 * | 3/2007 | | H04L 67/18 |
| WO | WO-2017058444 A1 * | 4/2017 | | G06F 3/165 |
| WO | 2019209271 A1 | 10/2019 | | |
| WO | WO-2019209271 A * | 10/2019 | | H04L 65/60 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Notice of Allowance dated Feb. 3, 2021, issued in connection with U.S. Appl. No. 16/811,105, filed Mar. 6, 2020, 9 pages.
Palm, Inc., "Handbook for the Palm VII Handheld," May 2000, 311 pages.
Presentations at WinHEC 2000, May 2000, 138 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

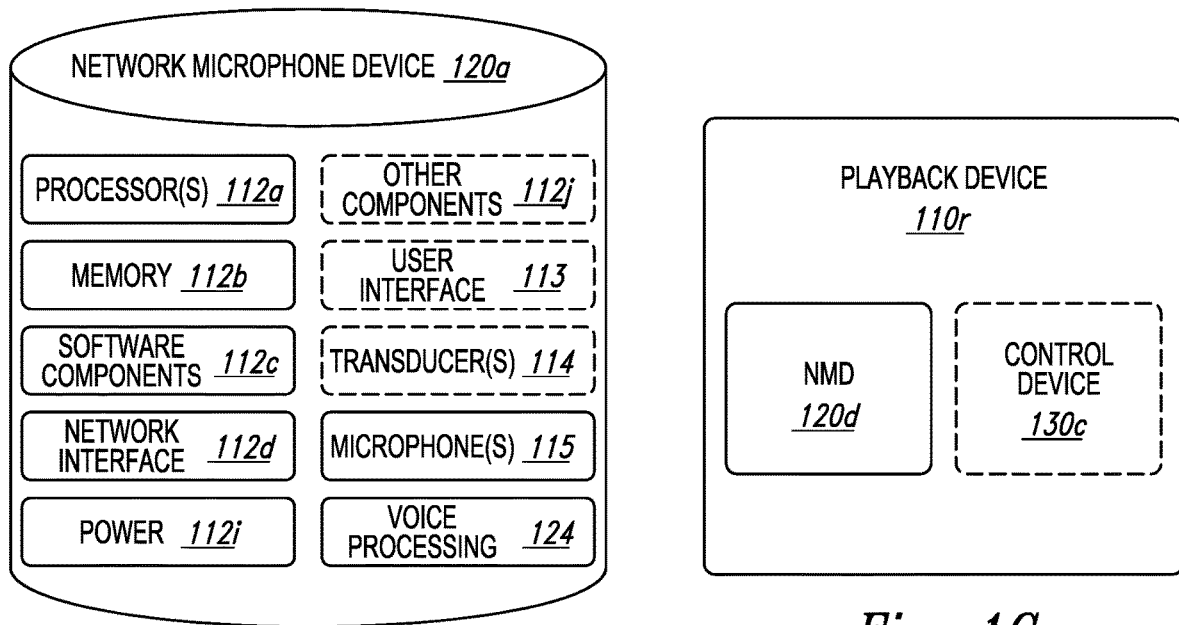
*Fig. 1F*
*Fig. 1G*
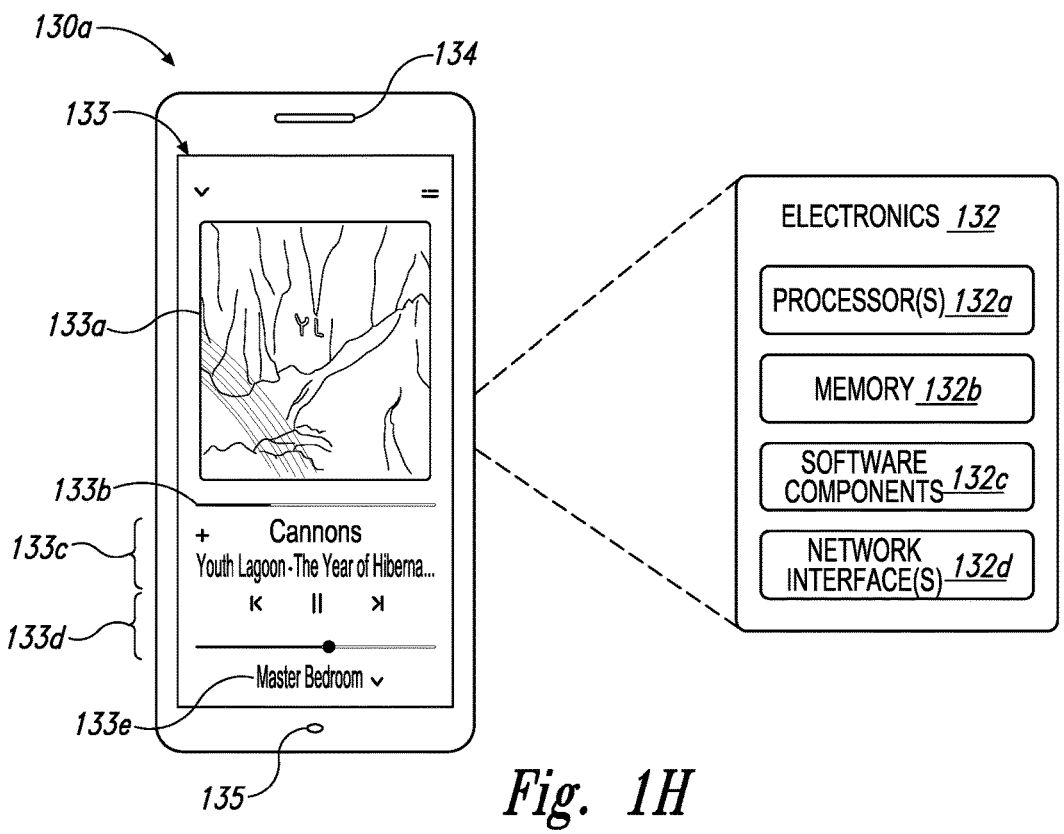
*Fig. 1H*

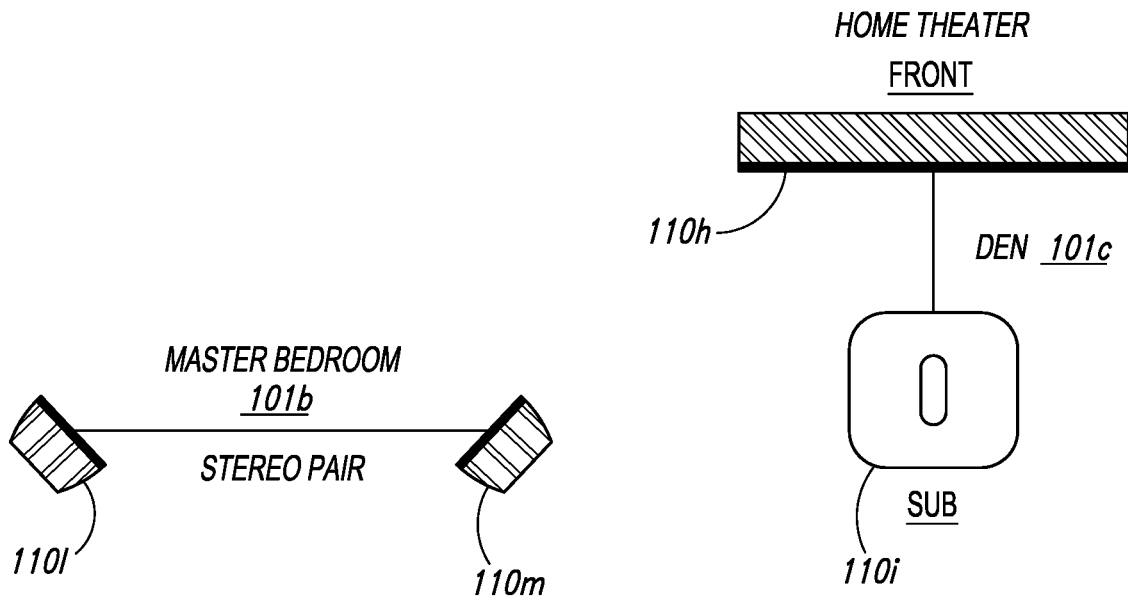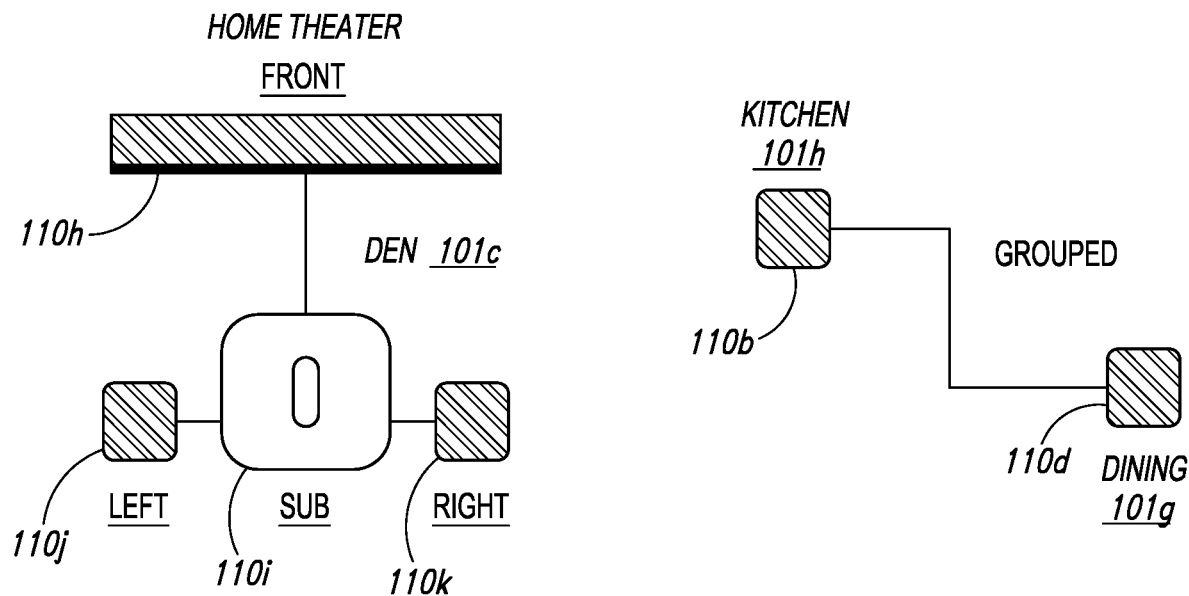

US 11,405,439 B2

HYBRID SNIFFING AND REBROADCAST FOR BLUETOOTH NETWORKS

CROSS-REFERENCE TO RELATED APPLICATIONS

The present application is a continuation of U.S. application Ser. No. 16/811,105 titled "Hybrid Sniffing and Rebroadcast for Bluetooth Networks," filed on Mar. 6, 2020, and currently pending. The entire contents of U.S. application Ser. No. 16/811,105 are incorporated herein by reference.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 1F shows a block diagram of a network microphone device.

FIG. 1G shows a block diagram of a playback device.

FIG. 1H shows a partially schematic diagram of a control device.

FIGS. 1-I through 1L show schematic diagrams of corresponding media playback system zones.

Figure 1A:
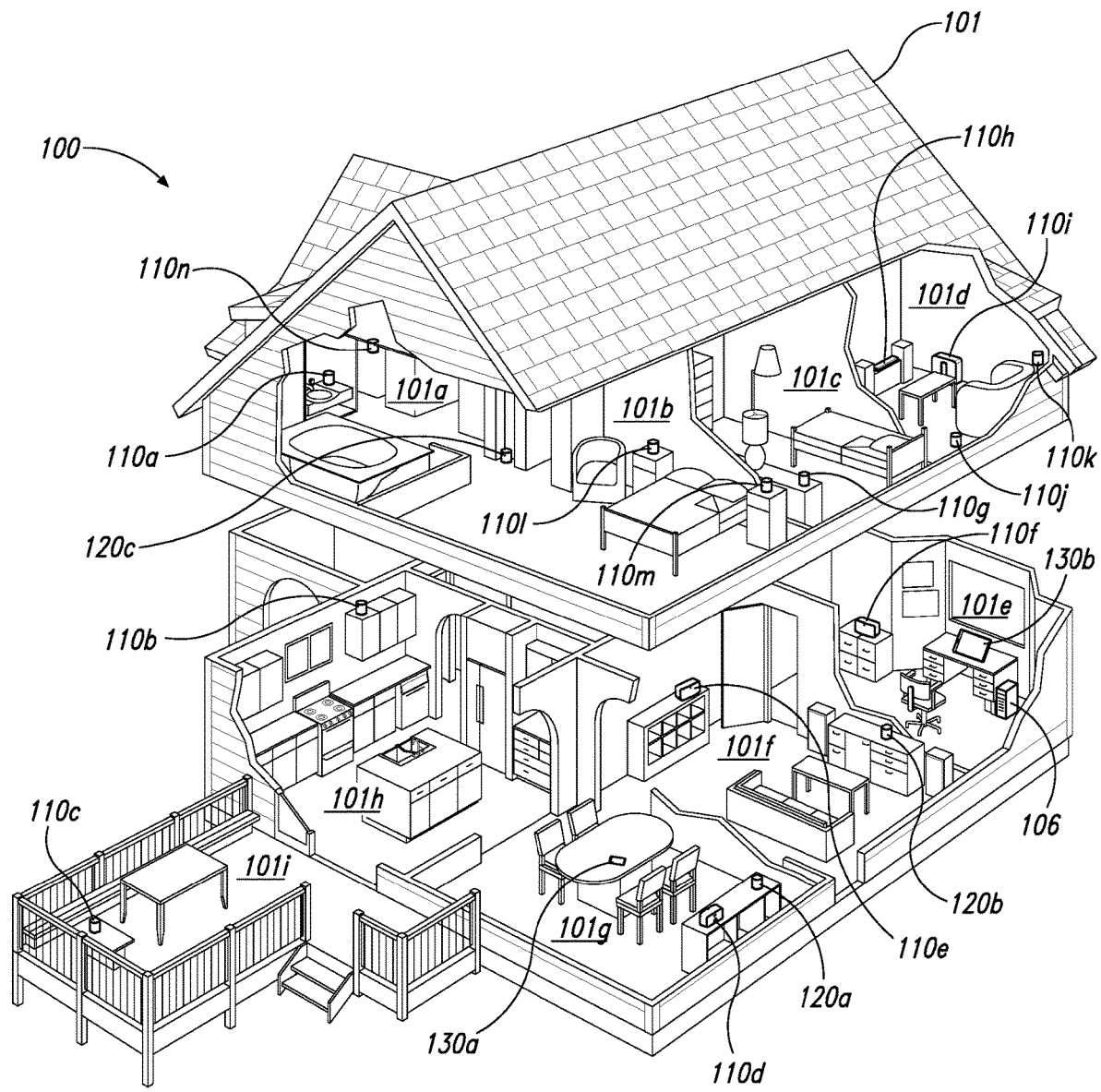
FIG. 1A shows a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

It is desirable to configure multiple networked media playback devices (sometimes referred to herein as playback devices or zone players) into a playback group of playback devices configured to play audio content in synchrony with each other. A group of playback devices configured to play audio content in synchrony with each other is sometimes referred to herein as a playback group, a synchrony group, a zone group, a bonded group, a bonded zone, and/or a stereo pair.

In some embodiments, one device (which may be a playback device or another type of computing device) in a playback group is designated as a group coordinator for the playback group and one or more other playback devices in the playback group are designated as group members. In some embodiments, the device designated as the group coordinator (i) obtains audio content for playback by the playback group, (ii) distributes the obtained audio content to the group members, and (iii) coordinates groupwise playback of the audio content by the playback devices in the playback group, including but not limited to coordinating playback of the audio content in synchrony by the playback devices in the playback group.

In some embodiments where the group coordinator is (or at least comprises) a playback device, the group coordinator may additionally play the obtained audio content in a groupwise fashion with the group members. In some embodiments, the group coordinator plays the obtained audio content in synchrony with the other group members in the playback group. But in other embodiments, the group coordinator may obtain, distribute, and coordinate groupwise and/or synchronous playback of the audio content by the group members, but the group coordinator may not itself play the obtained audio content.

In some scenarios, the group coordinator obtains audio content for playback by the playback group from an audio source separate from the group coordinator. The audio source may include a remote audio source accessible via the Internet or a local audio source accessible via a local area network (LAN) and/or a local communication link between the audio source and the group coordinator. Examples of audio sources include streaming media (audio, video) services, digital media servers or other computing systems, voice assistant services (VAS), televisions, cable set-top-boxes, streaming media players (e.g., AppleTV, Roku, gaming console), CD/DVD players, doorbells, intercoms, telephones/smartphones, tablets, or any other source of digital audio content now known or later developed.

In some scenarios, the group coordinator (i) obtains audio content for playback by the playback group via a first wireless transmission scheme between a local audio source (e.g., a smartphone) and the group coordinator and (ii) distributes the obtained audio content to the group members via a second wireless transmission scheme. For example, in some embodiments, the audio source transmits packets comprising audio content to the group coordinator via an Advanced Audio Distribution Profile (A2DP) Bluetooth link, and the group coordinator distributes the audio content to the group members via Connectionless Slave Broadcast (CSB) Bluetooth transmission.

In some embodiments, the group coordinator and the group members coordinate playback of the audio content in synchrony among the group members (and perhaps the group coordinator, too) via control messages (e.g., synchronous playback control messages) exchanged between the group coordinator and the group members. In some embodiments, the group coordinator transmits control messages to the group members via CSB transmissions. In some embodiments, the group coordinator transmits (and perhaps receives) control messages to the group members via one or more wireless signaling channels which may be implemented via one or more Classic Bluetooth and/or Bluetooth Low Energy (BLE) connections or any other type of connection suitable for exchanging signaling information for coordinating and managing synchronous playback among the playback devices in a playback group.

This scenario has advantages over some WiFi implementations because (i) it does not require a WiFi LAN infrastructure and (ii) when at least some of the group members are portable, battery-powered playback devices, the group members can be repositioned quickly and easily in a listening environment to accommodate the preferences and/or locations of listeners. The portability and repositionability advantages of such a scenario introduce technical challenges but also present opportunities for improved networking and battery-life performance that are not present in scenarios where the physical positions of the group members and/or the audio source remain fixed (or at least substantially fixed) during a playback session.

For example, because portable, battery-powered group members can be repositioned in a listening area during playback, it is possible for an individual group member to be repositioned in a location in the listening area where that individual group member receives CSB transmissions from the group coordinator at a low receive power and/or with a low signal-to-noise ratio due to signal attenuation, interference, reflections, or other wireless signal impairments.

To overcome or at least ameliorate the problems arising when an individual portable, battery-powered group member is positioned in (or repositioned in) a listening area where it receives CSB transmissions from the group coordinator at a low receive power and/or with a low signal-to-noise ratio, the systems and methods disclosed herein take advantage of the fact that the audio source may move about the listening area during a playback session in combination with certain aspects of Bluetooth transmission protocols.

In particular, because the audio source in the above-described scenario may also be repositioned in a listening area, an individual group member may be able to receive packets transmitted via the A2DP link from the audio source to the group coordinator at a higher receive power and/or higher signal-to-noise ratio than the packets received from the group coordinator via the CSB transmissions, which may occur because either (i) the individual group member has been positioned or repositioned far from the group coordinator or (ii) the individual group member and/or the audio source have been positioned (or repositioned) such that the individual group member is closer to the audio source than the group coordinator. For example, if the audio source is a smartphone in a person's hand or pocket, the audio source may move around the listening area as the person moves around in the listening area, and as a result, the audio source may move closer to or further from individual group members over time.

To take advantage of movement of the audio source about the listening area during a playback session, an individual group member in some embodiments is configured to selectively receive and/or process packets received via one of two streams of packets comprising audio content, where a first stream (e.g., a Bluetooth A2DP stream) is transmitted from the audio source via a first wireless connection and addressed to the group coordinator, and where a second stream (e.g., a Bluetooth CSB stream) is transmitted from the group coordinator via a second wireless connection and addressed to a broadcast group comprising at least the individual group member.

In some embodiments, the group coordinator (i) receives packets comprising audio content from an audio source via a Bluetooth A2DP stream, (ii) processes the received audio content, including determining playback timing for the audio content as described herein, and (iii) transmits the audio content to one or more group members via a CSB transmission. The group coordinator also transmits synchronous playback control messages to the one or more group members. The synchronous playback control messages may include clock timing and playback timing as described herein.

In operation, the group coordinator is configured to communicate with the audio source via the A2DP link during a first set of transmission time intervals and configured to communicate with the group members via the CSB link during a second set of transmission time intervals. In some embodiments, individual transmission time intervals in the first set of transmission time intervals do not overlap in time with individual transmission time intervals in the second set of transmission time intervals. In operation, the first and second sets of transmission time intervals comprise alternating transmit time intervals, e.g., one or more A2DP transmit time intervals, followed by one or more CSB transmit time intervals, followed by one or more A2DP transmit time intervals, followed by one or more CSB transmit time intervals, and so on. In some embodiments, each alternate time interval is on the order of a few milliseconds to tens of milliseconds.

When a group member joins a playback group, the group coordinator transmits communication configuration information to the group member that includes (i) information about the A2DP link (or channel) between the group coordinator and the audio source and (ii) information about the CSB link (or channel) between the group coordinator and the group members. For an individual link (or channel), the communication configuration information includes one or more of (i) a channel or link identifier, (ii) a frequency hopping sequence for the channel or link, (iii) a security key to decode transmissions, and/or (iv) other channel or link parameters that may be required or desired for the group member to transmit and/or receive data via the channel/link.

In some embodiments, the channel or link identifier and/or frequency hopping sequence for the channel or link individually or together at least in part define transmission time intervals for transmissions between Bluetooth devices. For example, in some embodiments, the group coordinator, individually or in combination with one or more group members, determines one or more of (i) transmission time intervals for CSB transmissions from the group coordinator to the group members, (ii) transmission time intervals for Bluetooth Classic transmissions to and/or from the group members, and/or (iii) transmission time intervals for Bluetooth Low Energy (BLE) transmissions to and/or from the group members. In some embodiments, the group coordinator additionally, individually or in combination with the audio source, determines transmission time intervals for A2DP transmissions to and/or from the audio source. In some embodiments, one or more (or each) of the group coordinator, group member(s), and/or audio source comprise a Bluetooth subsystem (a logical or physical component) that executes one or more scheduling algorithms to determine transmission time intervals for transmissions.

If the group member is in wireless reception range of the audio source, the group member can use the communication configuration information for the A2DP link to "listen" to the transmissions on the A2DP link during each A2DP transmission time interval. Individual transmissions on the A2DP link include audio content that the audio source transmits to the group coordinator. If the group member receives the audio content via an A2DP transmission from the audio source during an A2DP transmission time interval, then the group member can save power by choosing to not receive the audio content via a later CSB transmission from the group coordinator during a later CSB transmission time interval, or alternatively, if the group member received the audio content via the later CSB transmission, the group member may choose not to process or decode the audio content received via that later CSB transmission. In this manner, the group member selectively receives (or processes packets received) via one of two streams of packets comprising audio content, e.g., where the first stream comprises the A2DP stream from the audio source to the group coordinator and the second stream comprises the CSB stream from the group coordinator to the group member.

In some embodiments, selectively processing packets received via one of the two streams of packets comprising audio content additionally or alternatively includes the group member (i) comparing a quality metric(s) for a first wireless link/channel (e.g., the A2DP link) with the quality metric(s) for the second wireless link/channel (e.g., the CSB link), (ii) in response to determining that the quality metric(s) for the first wireless link/channel is better than the quality metric(s) for the second wireless link/channel, processing packets received from the audio source via the first wireless link/channel and addressed to the group coordinator, and (iii) in response to determining that the quality metric(s) for the second wireless link/channel is better than the quality metric(s) for the first wireless link/channel, processing packets received from the group coordinator via the second wireless link/channel and addressed to a broadcast group comprising at least the group member. In some embodiments, if the quality metric(s) for the first wireless link/channel (e.g., the A2DP link) are adequate, the group member may choose to save power by choosing not to receive packets via the second wireless link/channel (e.g., the CSB link). Or if the group member does receive packets via the second wireless link/channel, the group member may choose not to process or decode the packets received via the second wireless link/channel if the group member previously received the same packets via the first wireless link/channel.

These and other aspects of the technical solutions disclosed herein enable a group member to selectively receive and/or process packets of audio content transmitted from the audio source or transmitted from the group coordinator. By selectively receiving (or if received, selectively processing) packets transmitted from one of the two sources (i.e., from the audio source or from the group coordinator), the group member can operate more reliably and with lower battery power consumption over time.

For example, the group member can operate more reliably in scenarios where it can receive packets of audio content via the A2DP stream because, if the group member determines that one or more packets of audio content received via the A2DP stream are missing or corrupt for any reason, then the group member has another opportunity to receive valid packets of audio content in a later CSB transmission from the group coordinator to replace the missing or corrupt packets of audio content. Similarly, if the group coordinator requests that the audio source retransmit one or more packets comprising audio content, then the group member has a second opportunity to receive that same audio content, which can improve reliability even further. Additionally, the group member can operate with lower battery consumption over time in scenarios where it can reliably receive packets of audio content via one of the two streams (e.g., the A2DP and CSB streams) because, if the group member can receive the packets of audio content via one of the streams, the group member can choose to not receive the packets of audio content via the other stream by not powering its radio receiver during the transmission time intervals for the other stream.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110a is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110a-n), one or more network microphone devices ("NMDs"), 120 (identified individually as NMDs 120a-c), and one or more control devices 130 (identified individually as control devices 130a and 130b).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 100a) in synchrony with a second playback device (e.g., the playback device 100b). Interactions between the playback devices 110, NMDs 120, and/or control devices 130 of the media playback system 100 configured in accordance with the various embodiments of the disclosure are described in greater detail below with respect to FIGS. 1B-1L.

In the illustrated embodiment of FIG. 1A, the environment 101 comprises a household having several rooms, spaces, and/or playback zones, including (clockwise from upper left) a master bathroom 101a, a master bedroom 101b, a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101e, master bathroom 101a, master bedroom 101b, the second bedroom 101c, kitchen 101h, dining room 101g, living room 101f, and/or the patio 101i. In some aspects, a single playback zone may include multiple rooms or spaces. In certain aspects, a single room or space may include multiple playback zones.

In the illustrated embodiment of FIG. 1A, the master bathroom 101a, the second bedroom 101c, the office 101e, the living room 101f, the dining room 101g, the kitchen 101h, and the outdoor patio 101i each include one playback device 110, and the master bedroom 101b and the den 101d include a plurality of playback devices 110. In the master bedroom 101b, the playback devices 110l and 110m may be configured, for example, to play back audio content in synchrony as individual ones of playback devices 110, as a bonded playback zone, as a consolidated playback device, and/or any combination thereof. Similarly, in the den 101d, the playback devices 110h-j can be configured, for instance, to play back audio content in synchrony as individual ones of playback devices 110, as one or more bonded playback devices, and/or as one or more consolidated playback devices. Additional details regarding bonded and consolidated playback devices are described below with respect to, for example, FIGS. 1B and 1E and 1I-1M.

In some aspects, one or more of the playback zones in the environment 101 may each be playing different audio content. For instance, a user may be grilling on the patio 101i and listening to hip hop music being played by the playback device 110c while another user is preparing food in the kitchen 101h and listening to classical music played by the playback device 110b. In another example, a playback zone may play the same audio content in synchrony with another playback zone. For instance, the user may be in the office 101e listening to the playback device 110f playing back the same hip hop music being played back by playback device 110c on the patio 101i. In some aspects, the playback devices 110c and 110f play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
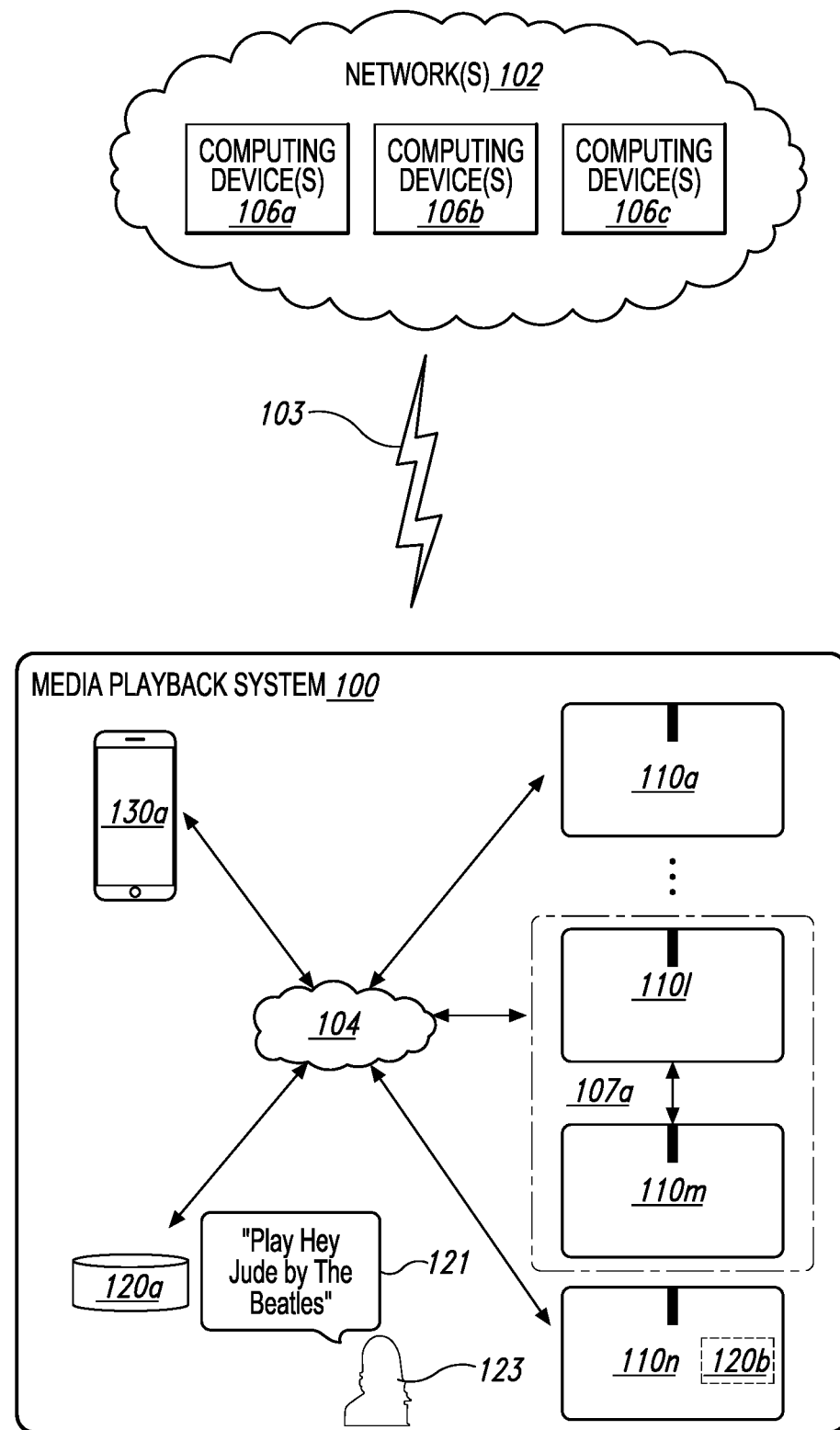
FIG. 1B shows a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some embodiments, the cloud network 102 is further configured to receive data (e.g. voice input data) from the media playback system 100 and correspondingly transmit commands and/or media content to the media playback system 100.

The cloud network 102 comprises computing devices 106 (identified separately as a first computing device 106a, a second computing device 106b, and a third computing device 106c). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices. Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household communication network (e.g., a household WiFi network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct connections, PANs, telecommunication networks, and/or other suitable communication links.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110*l* and 110*m* comprise a group 107a. The playback devices 110*l* and 110*m* can be positioned in different rooms in a household and be grouped together in the group 107a on a temporary or permanent basis based on user input received at the control device 130a and/or another control device 130 in the media playback system 100. When arranged in the group 107a, the playback devices 110*l* and 110*m* can be configured to play back the same or similar audio content in synchrony from one or more audio content sources. In certain embodiments, for example, the group 107a comprises a bonded zone in which the playback devices 110*l* and 110*m* comprise left audio and right audio channels, respectively, of multi-channel audio content, thereby producing or enhancing a stereo effect of the audio content. In some embodiments, the group 107a includes additional playback devices 110. In other embodiments, however, the media playback system 100 omits the group 107a and/or other grouped arrangements of the playback devices 110. Additional details regarding groups and other arrangements of playback devices are described in further detail below with respect to FIGS. 1-I through IM.

The media playback system 100 includes the NMDs 120a and 120d, each comprising one or more microphones configured to receive voice utterances from a user. In the illustrated embodiment of FIG. 1B, the NMD 120a is a standalone device and the NMD 120d is integrated into the playback device 110n. The NMD 120a, for example, is configured to receive voice input 121 from a user 123. In some embodiments, the NMD 120a transmits data associated with the received voice input 121 to a voice assistant service (VAS) configured to (i) process the received voice input data and (ii) transmit a corresponding command to the media playback system 100. In some aspects, for example, the computing device 106c comprises one or more modules and/or servers of a VAS (e.g., a VAS operated by one or more of SONOS®, AMAZON®, GOOGLE® APPLE®, MICROSOFT®). The computing device 106c can receive the voice input data from the NMD 120a via the network 104 and the links 103. In response to receiving the voice input data, the computing device 106c processes the voice input data (i.e., "Play Hey Jude by The Beatles"), and determines that the processed voice input includes a command to play a song (e.g., "Hey Jude"). The computing device 106c accordingly transmits commands to the media playback system 100 to play back "Hey Jude" by the Beatles from a suitable media service (e.g., via one or more of the computing devices 106) on one or more of the playback devices 110.

b. Suitable Playback Devices

Figure 1C:
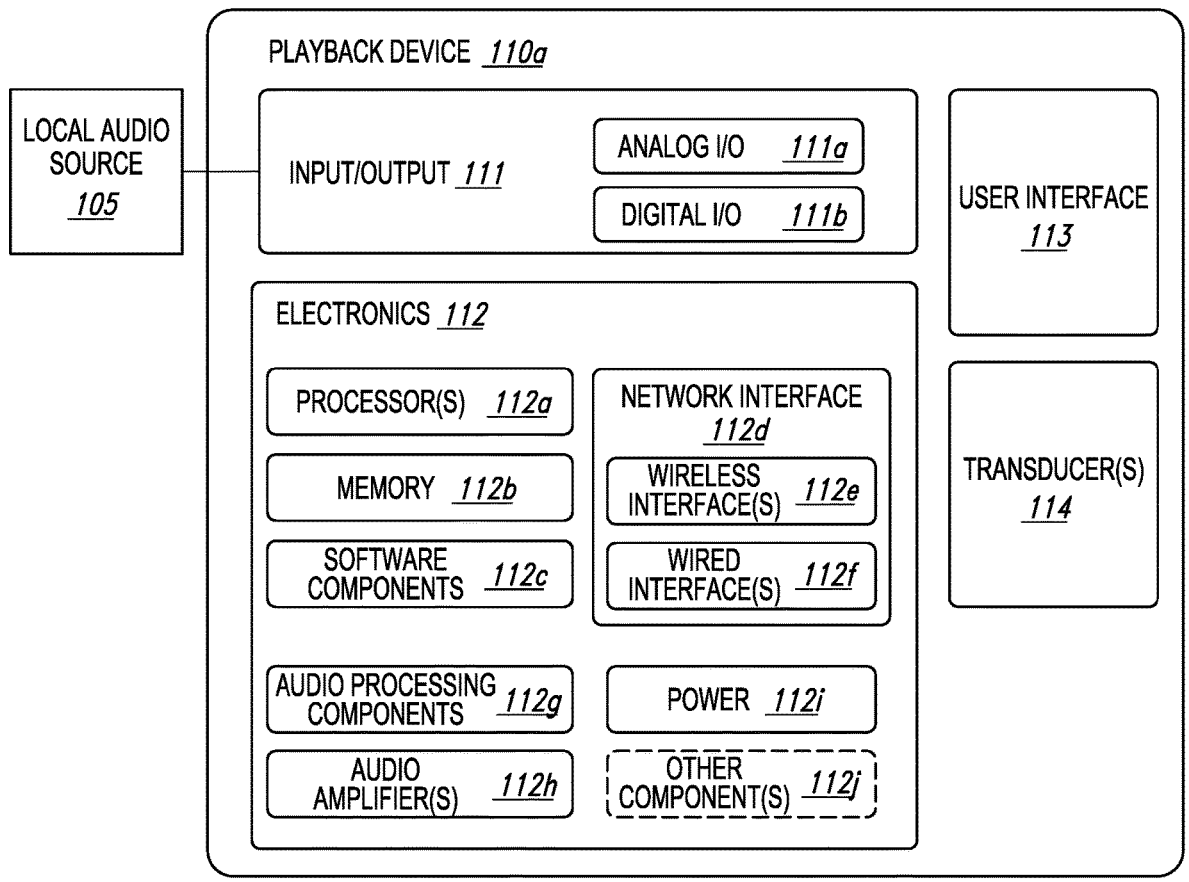
FIG. 1C shows a block diagram of a playback device.

FIG. 1C is a block diagram of the playback device 110a comprising an input/output 111. The input/output 111 can include an analog I/O 111a (e.g., one or more wires, cables, and/or other suitable communication links configured to carry analog signals) and/or a digital I/O 111b (e.g., one or more wires, cables, or other suitable communication links configured to carry digital signals). In some embodiments, the analog I/O 111a is an audio line-in input connection comprising, for example, an auto-detecting 3.5 mm audio line-in connection. In some embodiments, the digital I/O 111b comprises a Sony/Philips Digital Interface Format (S/PDIF) communication interface and/or cable and/or a Toshiba Link (TOSLINK) cable. In some embodiments, the digital I/O 111b comprises an High-Definition Multimedia Interface (HDMI) interface and/or cable. In some embodiments, the digital I/O 111b includes one or more wireless communication links comprising, for example, a radio frequency (RF), infrared, WiFi, Bluetooth, or another suitable communication protocol. In certain embodiments, the analog I/O 111a and the digital I/O 111b comprise interfaces (e.g., ports, plugs, jacks) configured to receive connectors of cables transmitting analog and digital signals, respectively, without necessarily including cables.

The playback device 110a, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110a does not include an input/output 111 and receives all audio content via the network 104.

The playback device 110a further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106a-c via the network 104 (FIG. 1B)), amplify the received audio, and output the amplified audio for playback via one or more of the transducers 114. In some embodiments, the playback device 110a optionally includes one or more microphones 115 (e.g., a single microphone, a plurality of microphones, a microphone array) (hereinafter referred to as "the microphones 115"). In certain embodiments, for example, the playback device 110a having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112a (referred to hereinafter as "the processors 112a"), memory 112b, software components 112c, a network interface 112d, one or more audio processing components 112g (referred to hereinafter as "the audio components 112g"), one or more audio amplifiers 112h (referred to hereinafter as "the amplifiers 112h"), and power 112i (e.g., one or more power supplies, power cables, power receptacles, batteries, induction coils, Power-over Ethernet (POE) interfaces, and/or other suitable sources of electric power). In some embodiments, the electronics 112 optionally include one or more other components 112j (e.g., one or more sensors, video displays, touchscreens, battery charging bases).

The processors 112a can comprise clock-driven computing component(s) configured to process data, and the memory 112b can comprise a computer-readable medium (e.g., a tangible, non-transitory computer-readable medium, data storage loaded with one or more of the software components 112c) configured to store instructions for performing various operations and/or functions. The processors 112a are configured to execute the instructions stored on the memory 112b to perform one or more of the operations. The operations can include, for example, causing the playback device 110a to retrieve audio content from an audio source (e.g., one or more of the computing devices 106a-c (FIG. 1B)), and/or another one of the playback devices 110. In some embodiments, the operations further include causing the playback device 110a to send audio content to another one of the playback devices 110a and/or another device (e.g., one of the NMDs 120). Certain embodiments include operations causing the playback device 110a to pair with another of the one or more playback devices 110 to enable a multi-channel audio environment (e.g., a stereo pair, a bonded zone).

The processors 112a can be further configured to perform operations causing the playback device 110a to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110a and the other one or more other playback devices 110. Additional details regarding audio playback synchronization among playback devices can be found, for example, in U.S. Pat. No. 8,234,395, which was incorporated by reference above.

In some embodiments, the memory 112b is further configured to store data associated with the playback device 110a, such as one or more zones and/or zone groups of which the playback device 110a is a member, audio sources accessible to the playback device 110a, and/or a playback queue that the playback device 110a (and/or another of the one or more playback devices) can be associated with. The stored data can comprise one or more state variables that are periodically updated and used to describe a state of the playback device 110a. The memory 112b can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112d is configured to facilitate a transmission of data between the playback device 110a and one or more other devices on a data network such as, for example, the links 103 and/or the network 104 (FIG. 1B). The network interface 112d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112d can parse the digital packet data such that the electronics 112 properly receives and processes the data destined for the playback device 110a.

In the illustrated embodiment of FIG. 1C, the network interface 112d comprises one or more wireless interfaces 112e (referred to hereinafter as "the wireless interface 112e"). The wireless interface 112e (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some embodiments, the network interface 112d optionally includes a wired interface 112f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112d includes the wired interface 112f and excludes the wireless interface 112e. In some embodiments, the electronics 112 excludes the network interface 112d altogether and transmits and receives media content and/or other data via another communication path (e.g., the input/output 111).

The audio processing components 112g are configured to process and/or filter data comprising media content received by the electronics 112 (e.g., via the input/output 111 and/or the network interface 112d) to produce output audio signals. In some embodiments, the audio processing components 112g comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112g can comprise one or more subcomponents of the processors 112a. In some embodiments, the electronics 112 omits the audio processing components 112g. In some aspects, for example, the processors 112a execute instructions stored on the memory 112b to perform audio processing operations to produce the output audio signals.

The amplifiers 112h are configured to receive and amplify the audio output signals produced by the audio processing components 112g and/or the processors 112a. The amplifiers 112h can comprise electronic devices and/or components configured to amplify audio signals to levels sufficient for driving one or more of the transducers 114. In some embodiments, for example, the amplifiers 112h include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112h comprise a suitable combination of two or more of the foregoing types of power amplifiers. Moreover, in some embodiments, individual ones of the amplifiers 112h correspond to individual ones of the transducers 114. In other embodiments, however, the electronics 112 includes a single one of the amplifiers 112h configured to output amplified audio signals to a plurality of the transducers 114. In some other embodiments, the electronics 112 omits the amplifiers 112h.

The transducers 114 (e.g., one or more speakers and/or speaker drivers) receive the amplified audio signals from the amplifier 112h and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

Figure 1D:
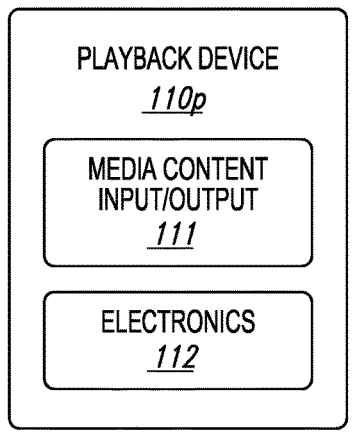
FIG. 1D shows a block diagram of a playback device.

By way of illustration, SONOS, Inc. presently offers (or has offered) for sale certain playback devices including, for example, a "SONOS ONE," "PLAY:1," "PLAY:3," "PLAY: 5," "PLAYBAR," "PLAYBASE," "CONNECT:AMP," "CONNECT," and "SUB." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110p comprising the input/output 111 and electronics 112 without the user interface 113 or transducers 114.

Figure 1E:
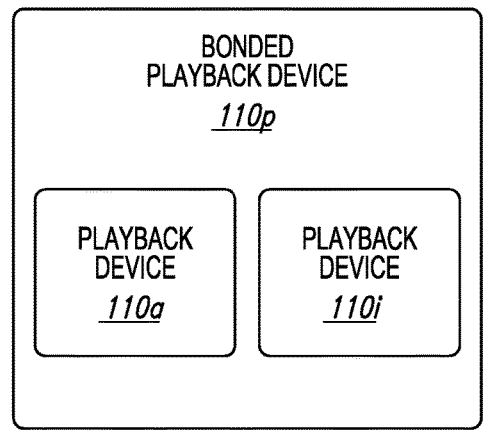
FIG. 1E shows a block diagram of a network microphone device.

FIG. 1E is a block diagram of a bonded playback device 110q comprising the playback device 110a (FIG. 1C) sonically bonded with the playback device 110i (e.g., a subwoofer) (FIG. 1A). In the illustrated embodiment, the playback devices 110a and 110i are separate ones of the playback devices 110 housed in separate enclosures. In some embodiments, however, the bonded playback device 110q comprises a single enclosure housing both the playback devices 110a and 110i. The bonded playback device 110q can be configured to process and reproduce sound differently than an unbonded playback device (e.g., the playback device 110a of FIG. 1C) and/or paired or bonded playback devices (e.g., the playback devices 110l and 110m of FIG. 1B). In some embodiments, for example, the playback device 110a is full-range playback device configured to render low frequency, mid-range frequency, and high frequency audio content, and the playback device 110i is a subwoofer configured to render low frequency audio content. In some aspects, the playback device 110a, when bonded with the first playback device, is configured to render only the mid-range and high frequency components of a particular audio content, while the playback device 110i renders the low frequency component of the particular audio content. In some embodiments, the bonded playback device 110q includes additional playback devices and/or another bonded playback device. Additional playback device embodiments are described in further detail below with respect to FIGS. 2A-3D.

c. Suitable Network Microphone Devices (NMDs)

FIG. 1F is a block diagram of the NMD 120a (FIGS. 1A and 1B). The NMD 120a includes one or more voice processing components 124 (hereinafter "the voice components 124") and several components described with respect to the playback device 110a (FIG. 1C) including the processors 112a, the memory 112b, and the microphones 115. The NMD 120a optionally comprises other components also included in the playback device 110a (FIG. 1C), such as the user interface 113 and/or the transducers 114. In some embodiments, the NMD 120a is configured as a media playback device (e.g., one or more of the playback devices 110), and further includes, for example, one or more of the audio processing components 112g (FIG. 1C), the transducers 114, and/or other playback device components. In certain embodiments, the NMD 120a comprises an Internet of Things (IoT) device such as, for example, a thermostat, alarm panel, fire and/or smoke detector, etc. In some embodiments, the NMD 120a comprises the microphones 115, the voice processing 124, and only a portion of the components of the electronics 112 described above with respect to FIG. 1B. In some aspects, for example, the NMD 120a includes the processor 112a and the memory 112b (FIG. 1B), while omitting one or more other components of the electronics 112. In some embodiments, the NMD 120a includes additional components (e.g., one or more sensors, cameras, thermometers, barometers, hygrometers).

In some embodiments, an NMD can be integrated into a playback device. FIG. 1G is a block diagram of a playback device 110r comprising an NMD 120d. The playback device 110r can comprise many or all of the components of the playback device 110a and further include the microphones 115 and voice processing 124 (FIG. 1F). The playback device 110r optionally includes an integrated control device 130c. The control device 130c can comprise, for example, a user interface (e.g., the user interface 113 of FIG. 1B) configured to receive user input (e.g., touch input, voice input) without a separate control device. In other embodiments, however, the playback device 110r receives commands from another control device (e.g., the control device 130a of FIG. 1B). Additional NMD embodiments are described in further detail below with respect to FIGS. 3A-3F.

Referring again to FIG. 1F, the microphones 115 are configured to acquire, capture, and/or receive sound from an environment (e.g., the environment 101 of FIG. 1A) and/or a room in which the NMD 120a is positioned. The received sound can include, for example, vocal utterances, audio played back by the NMD 120a and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home. Additional description regarding receiving and processing voice input data can be found in further detail below with respect to FIGS. 3A-3F.

d. Suitable Control Devices

FIG. 1H is a partially schematic diagram of the control device 130a (FIGS. 1A and 1B). As used herein, the term "control device" can be used interchangeably with "controller" or "control system." Among other features, the control device 130a is configured to receive user input related to the media playback system 100 and, in response, cause one or more devices in the media playback system 100 to perform an action(s) or operation(s) corresponding to the user input. In the illustrated embodiment, the control device 130a comprises a smartphone (e.g., an iPhone™, an Android phone) on which media playback system controller application software is installed. In some embodiments, the control device 130a comprises, for example, a tablet (e.g., an iPad™), a computer (e.g., a laptop computer, a desktop computer), and/or another suitable device (e.g., a television, an automobile audio head unit, an IoT device). In certain embodiments, the control device 130a comprises a dedicated controller for the media playback system 100. In other embodiments, as described above with respect to FIG. 1G, the control device 130a is integrated into another device in the media playback system 100 (e.g., one more of the playback devices 110, NMDs 120, and/or other suitable devices configured to communicate over a network).

The control device 130a includes electronics 132, a user interface 133, one or more speakers 134, and one or more microphones 135. The electronics 132 comprise one or more processors 132a (referred to hereinafter as "the processors 132a"), a memory 132b, software components 132c, and a network interface 132d. The processor 132a can be configured to perform functions relevant to facilitating user access, control, and configuration of the media playback system 100. The memory 132b can comprise data storage that can be loaded with one or more of the software components executable by the processor 302 to perform those functions. The software components 132c can comprise applications and/or other executable software configured to facilitate control of the media playback system 100. The memory 112b can be configured to store, for example, the software components 132c, media playback system controller application software, and/or other data associated with the media playback system 100 and the user.

The network interface 132d is configured to facilitate network communications between the control device 130a and one or more other devices in the media playback system 100, and/or one or more remote devices. In some embodiments, the network interface 132d is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132d can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132d can transmit a playback device control command (e.g., volume control, audio playback control, audio content selection) from the control device 304 to one or more of playback devices. The network interface 132d can also transmit and/or receive configuration changes such as, for example, adding/removing one or more playback devices to/from a zone, adding/removing one or more zones to/from a zone group, forming a bonded or consolidated player, separating one or more playback devices from a bonded or consolidated player, among others. Additional description of zones and groups can be found below with respect to FIGS. 1-I through 1M.

The user interface 133 is configured to receive user input and can facilitate control of the media playback system 100. The user interface 133 includes media content art 133a (e.g., album art, lyrics, videos), a playback status indicator 133b (e.g., an elapsed and/or remaining time indicator), media content information region 133c, a playback control region 133d, and a zone indicator 133e. The media content information region 133c can include a display of relevant information (e.g., title, artist, album, genre, release year) about media content currently playing and/or media content in a queue or playlist. The playback control region 133d can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133d may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130a. In some embodiments, the one or more speakers comprise individual transducers configured to correspondingly output low frequencies, mid-range frequencies, and/or high frequencies. In some aspects, for example, the control device 130a is configured as a playback device (e.g., one of the playback devices 110). Similarly, in some embodiments the control device 130a is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130a is configured to operate as playback device and an NMD. In other embodiments, however, the control device 130a omits the one or more speakers 134 and/or the one or more microphones 135. For instance, the control device 130a may comprise a device (e.g., a thermostat, an IoT device, a network device) comprising a portion of the electronics 132 and the user interface 133 (e.g., a touch screen) without any speakers or microphones. Additional control device embodiments are described in further detail below with respect to FIGS. 4A-4D and 5.

e. Suitable Playback Device Configurations

Figure 1M:
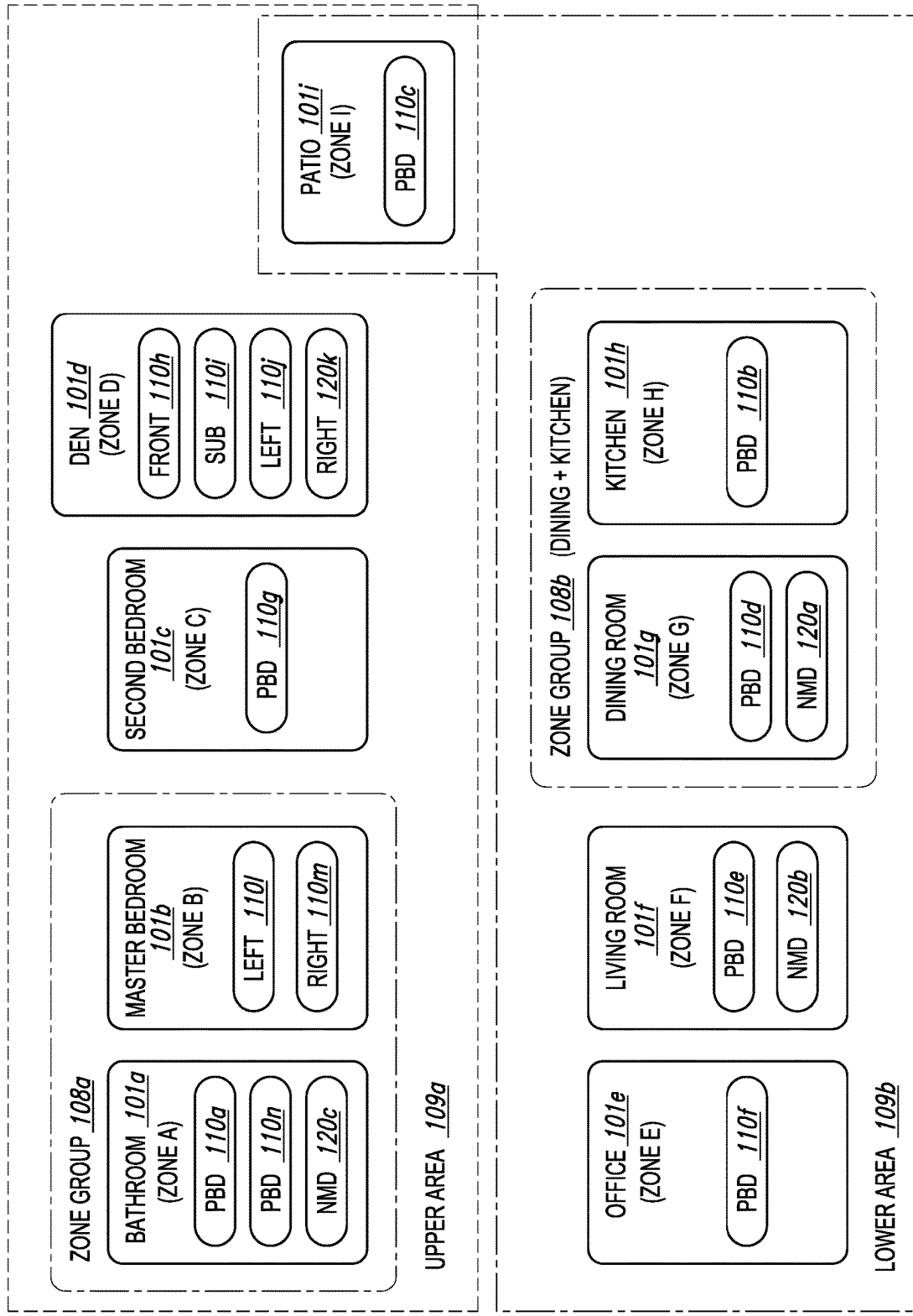
FIG. 1M shows a schematic diagram of media playback system areas.

FIGS. 1-1 through 1M show example configurations of playback devices in zones and zone groups. Referring first to FIG. 1M, in one example, a single playback device may belong to a zone. For example, the playback device 110g in the second bedroom 101c (FIG. 1A) may belong to Zone C. In some implementations described below, multiple playback devices may be "bonded" to form a "bonded pair" which together form a single zone. For example, the playback device 110l (e.g., a left playback device) can be bonded to the playback device 110*l* (e.g., a left playback device) to form Zone A. Bonded playback devices may have different playback responsibilities (e.g., channel responsibilities). In another implementation described below, multiple playback devices may be merged to form a single zone. For example, the playback device 110*h* (e.g., a front playback device) may be merged with the playback device 110*i* (e.g., a subwoofer), and the playback devices 110*j* and 110*k* (e.g., left and right surround speakers, respectively) to form a single Zone D. In another example, the playback devices 110*g* and 110*h* can be be merged to form a merged group or a zone group 108*b*. The merged playback devices 110*g* and 110*h* may not be specifically assigned different playback responsibilities. That is, the merged playback devices 110*h* and 110*i* may, aside from playing audio content in synchrony, each play audio content as they would if they were not merged.

Each zone in the media playback system 100 may be provided for control as a single user interface (UI) entity. For example, Zone A may be provided as a single entity named Master Bathroom. Zone B may be provided as a single entity named Master Bedroom. Zone C may be provided as a single entity named Second Bedroom.

Playback devices that are bonded may have different playback responsibilities, such as responsibilities for certain audio channels. For example, as shown in FIG. 1-I, the playback devices 110*l* and 110*m* may be bonded so as to produce or enhance a stereo effect of audio content. In this example, the playback device 110*l* may be configured to play a left channel audio component, while the playback device 110*k* may be configured to play a right channel audio component. In some implementations, such stereo bonding may be referred to as "pairing."

Additionally, bonded playback devices may have additional and/or different respective speaker drivers. As shown in FIG. 1J, the playback device 110*h* named Front may be bonded with the playback device 110*i* named SUB. The Front device 110*h* can be configured to render a range of mid to high frequencies and the SUB device 110*i* can be configured render low frequencies. When unbonded, however, the Front device 110*h* can be configured render a full range of frequencies. As another example, FIG. 1K shows the Front and SUB devices 110*h* and 110*i* further bonded with Left and Right playback devices 110*j* and 110*k*, respectively. In some implementations, the Right and Left devices 110*j* and 102*k* can be configured to form surround or "satellite" channels of a home theater system. The bonded playback devices 110*h*, 110*i*, 110*j*, and 110*k* may form a single Zone D (FIG. 1M).

Playback devices that are merged may not have assigned playback responsibilities, and may each render the full range of audio content the respective playback device is capable of. Nevertheless, merged devices may be represented as a single UI entity (i.e., a zone, as discussed above). For instance, the playback devices 110*a* and 110*n* the master bathroom have the single UI entity of Zone A. In one embodiment, the playback devices 110*a* and 110*n* may each output the full range of audio content each respective playback devices 110*a* and 110*n* are capable of, in synchrony.

In some embodiments, an NMD is bonded or merged with another device so as to form a zone. For example, the NMD 120*b* may be bonded with the playback device 110*e*, which together form Zone F, named Living Room. In other embodiments, a stand-alone network microphone device may be in a zone by itself. In other embodiments, however, a stand-alone network microphone device may not be associated with a zone. Additional details regarding associating network microphone devices and playback devices as designated or default devices may be found, for example, in previously referenced U.S. patent application Ser. No. 15/438,749.

Zones of individual, bonded, and/or merged devices may be grouped to form a zone group. For example, referring to FIG. 1M, Zone A may be grouped with Zone B to form a zone group 108*a* that includes the two zones. Similarly, Zone G may be grouped with Zone H to form the zone group 108*b*. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234, 395. Playback devices may be dynamically grouped and ungrouped to form new or different groups that synchronously play back audio content.

In various implementations, the zones in an environment may be the default name of a zone within the group or a combination of the names of the zones within a zone group. For example, Zone Group 108*b* can have be assigned a name such as "Dining+Kitchen", as shown in FIG. 1M. In some embodiments, a zone group may be given a unique name selected by a user.

Certain data may be stored in a memory of a playback device (e.g., the memory 112*b* of FIG. 1C) as one or more state variables that are periodically updated and used to describe the state of a playback zone, the playback device(s), and/or a zone group associated therewith. The memory may also include the data associated with the state of the other devices of the media system, and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, identifiers associated with the second bedroom 101*c* may indicate that the playback device is the only playback device of the Zone C and not in a zone group. Identifiers associated with the Den may indicate that the Den is not grouped with other zones but includes bonded playback devices 110*h*-110*k*. Identifiers associated with the Dining Room may indicate that the Dining Room is part of the Dining+Kitchen zone group 108*b* and that devices 110*b* and 110*d* are grouped (FIG. 1L). Identifiers associated with the Kitchen may indicate the same or similar information by virtue of the Kitchen being part of the Dining+Kitchen zone group 108*b*. Other example zone variables and identifiers are described below.

In yet another example, the media playback system 100 may variables or identifiers representing other associations of zones and zone groups, such as identifiers associated with Areas, as shown in FIG. 1M. An area may involve a cluster of zone groups and/or zones not within a zone group. For instance, FIG. 1M shows an Upper Area 109*a* including Zones A-D, and a Lower Area 109*b* including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the media playback system 100 may not implement Areas, in which case the system may not store variables associated with Areas.

III. Example Systems and Devices

Figure 2A:
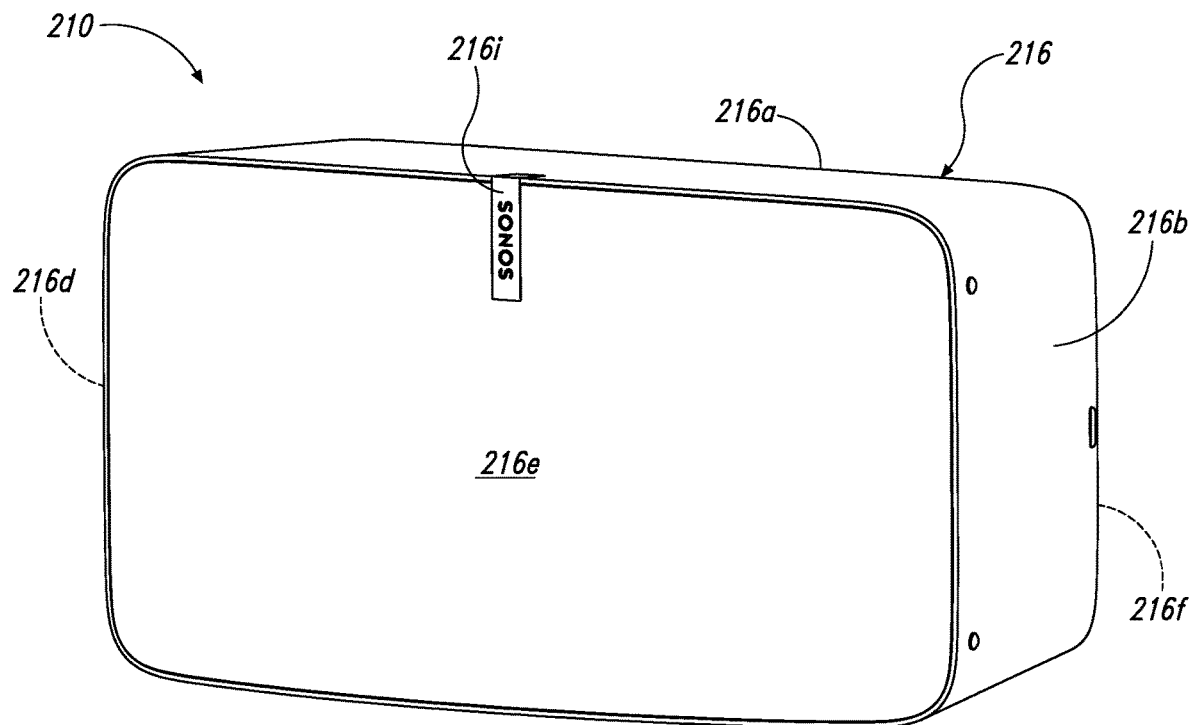
FIG. 2A shows a front isometric view of a playback device configured in accordance with aspects of the disclosed technology.
Figure 2B:
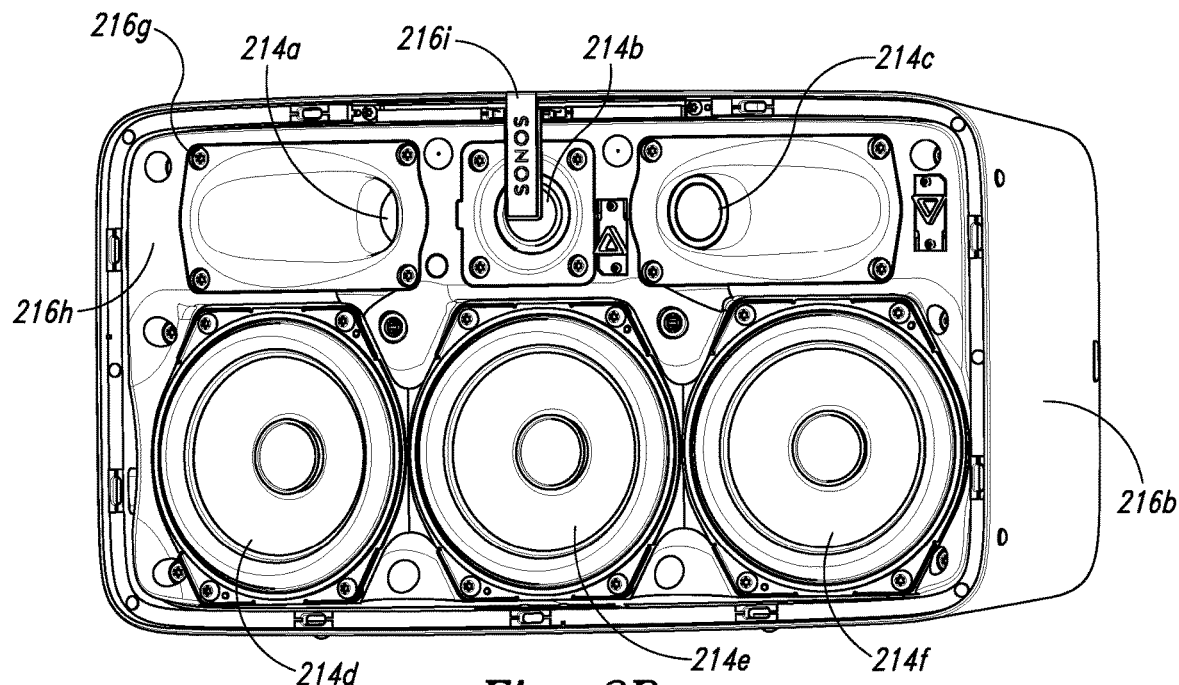
FIG. 2B shows a front isometric view of the playback device of FIG. 3A without a grille.
Figure 2C:
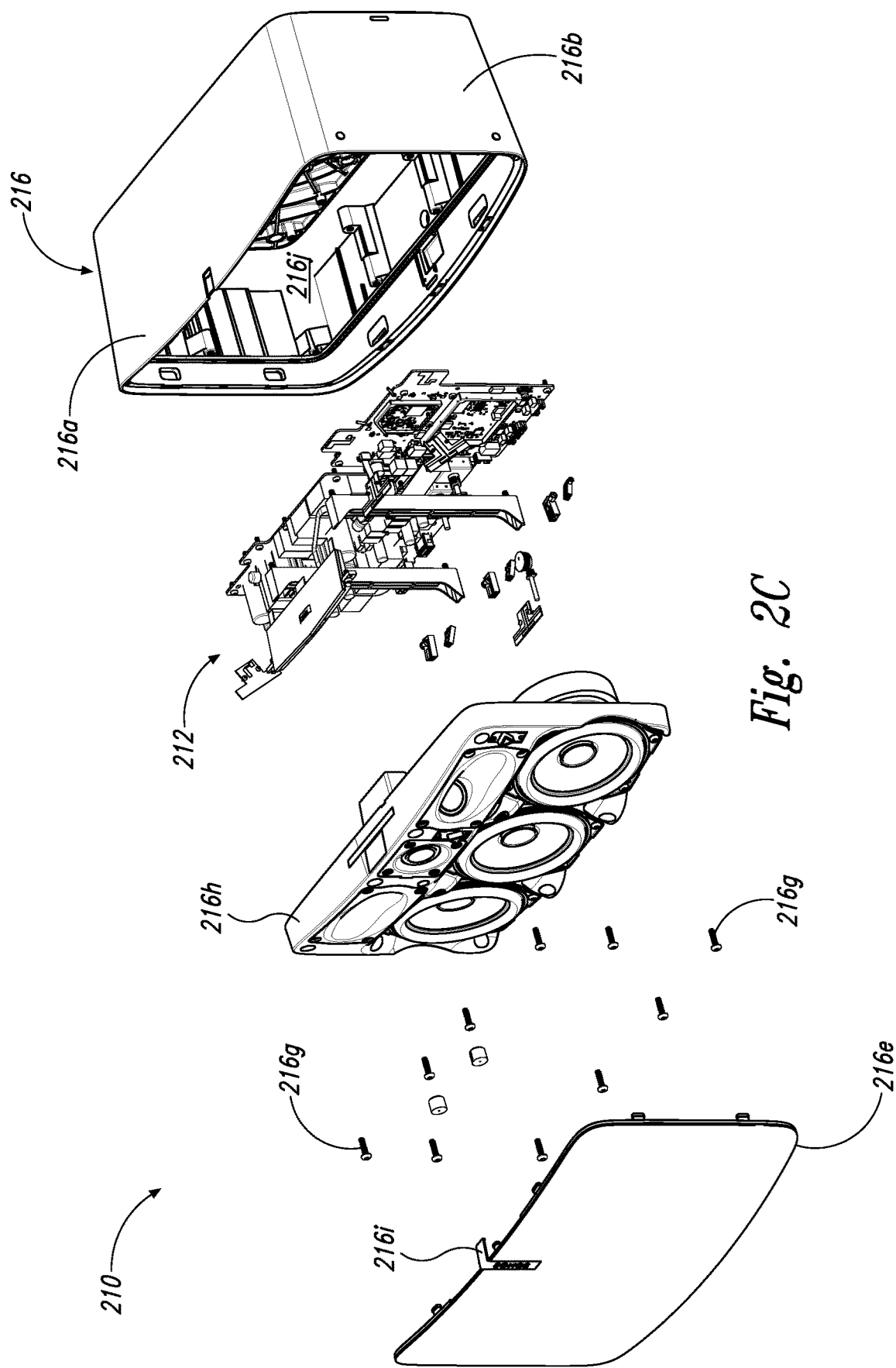
FIG. 2C shows an exploded view of the playback device of FIG. 2A.

FIG. 2A is a front isometric view of a playback device 210 configured in accordance with aspects of the disclosed technology. FIG. 2B is a front isometric view of the playback device 210 without a grille 216e. FIG. 2C is an exploded view of the playback device 210. Referring to FIGS. 2A-2C together, the playback device 210 comprises a housing 216 that includes an upper portion 216a, a right or first side portion 216b, a lower portion 216c, a left or second side portion 216d, the grille 216e, and a rear portion 216f. A plurality of fasteners 216g (e.g., one or more screws, rivets, clips) attaches a frame 216h to the housing 216. A cavity 216j (FIG. 2C) in the housing 216 is configured to receive the frame 216h and electronics 212. The frame 216h is configured to carry a plurality of transducers 214 (identified individually in FIG. 2B as transducers 214a-f). The electronics 212 (e.g., the electronics 112 of FIG. 1C) is configured to receive audio content from an audio source and send electrical signals corresponding to the audio content to the transducers 214 for playback.

The transducers 214 are configured to receive the electrical signals from the electronics 112, and further configured to convert the received electrical signals into audible sound during playback. For instance, the transducers 214a-c (e.g., tweeters) can be configured to output high frequency sound (e.g., sound waves having a frequency greater than about 2 kHz). The transducers 214d-f (e.g., mid-woofers, woofers, midrange speakers) can be configured output sound at frequencies lower than the transducers 214a-c (e.g., sound waves having a frequency lower than about 2 kHz). In some embodiments, the playback device 210 includes a number of transducers different than those illustrated in FIGS. 2A-2C. For example, as described in further detail below with respect to FIGS. 3A-3C, the playback device 210 can include fewer than six transducers (e.g., one, two, three). In other embodiments, however, the playback device 210 includes more than six transducers (e.g., nine, ten). Moreover, in some embodiments, all or a portion of the transducers 214 are configured to operate as a phased array to desirably adjust (e.g., narrow or widen) a radiation pattern of the transducers 214, thereby altering a user's perception of the sound emitted from the playback device 210.

In the illustrated embodiment of FIGS. 2A-2C, a filter 216i is axially aligned with the transducer 214b. The filter 216i can be configured to desirably attenuate a predetermined range of frequencies that the transducer 214b outputs to improve sound quality and a perceived sound stage output collectively by the transducers 214. In some embodiments, however, the playback device 210 omits the filter 216i. In other embodiments, the playback device 210 includes one or more additional filters aligned with the transducers 214b and/or at least another of the transducers 214.

Figure 3A:
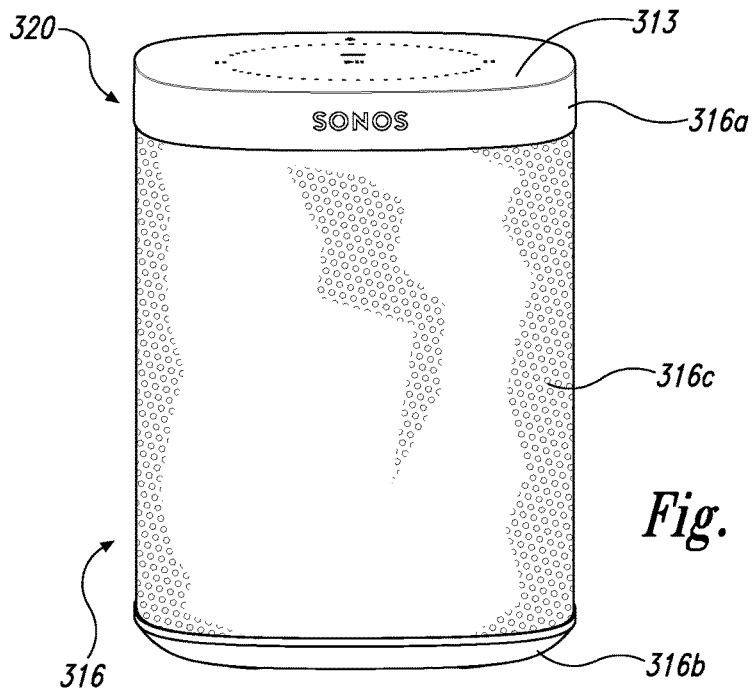
FIG. 3A shows a front view of a network microphone device configured in accordance with aspects of the disclosed technology.
Figure 3B:
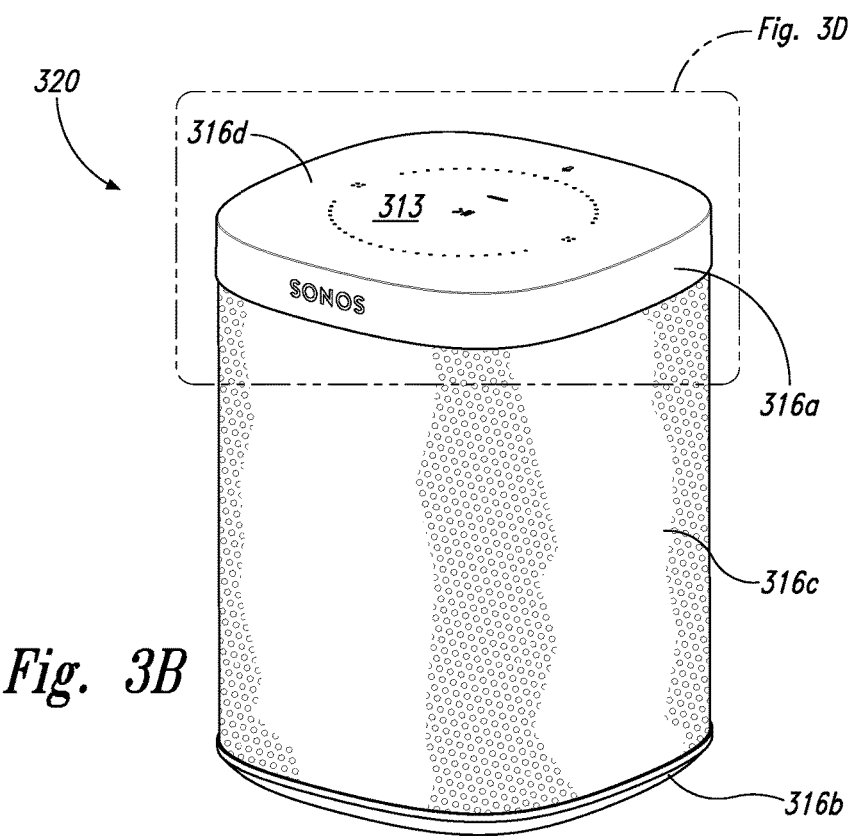
FIG. 3B shows a side isometric view of the network microphone device of FIG. 3A.
Figure 3C:
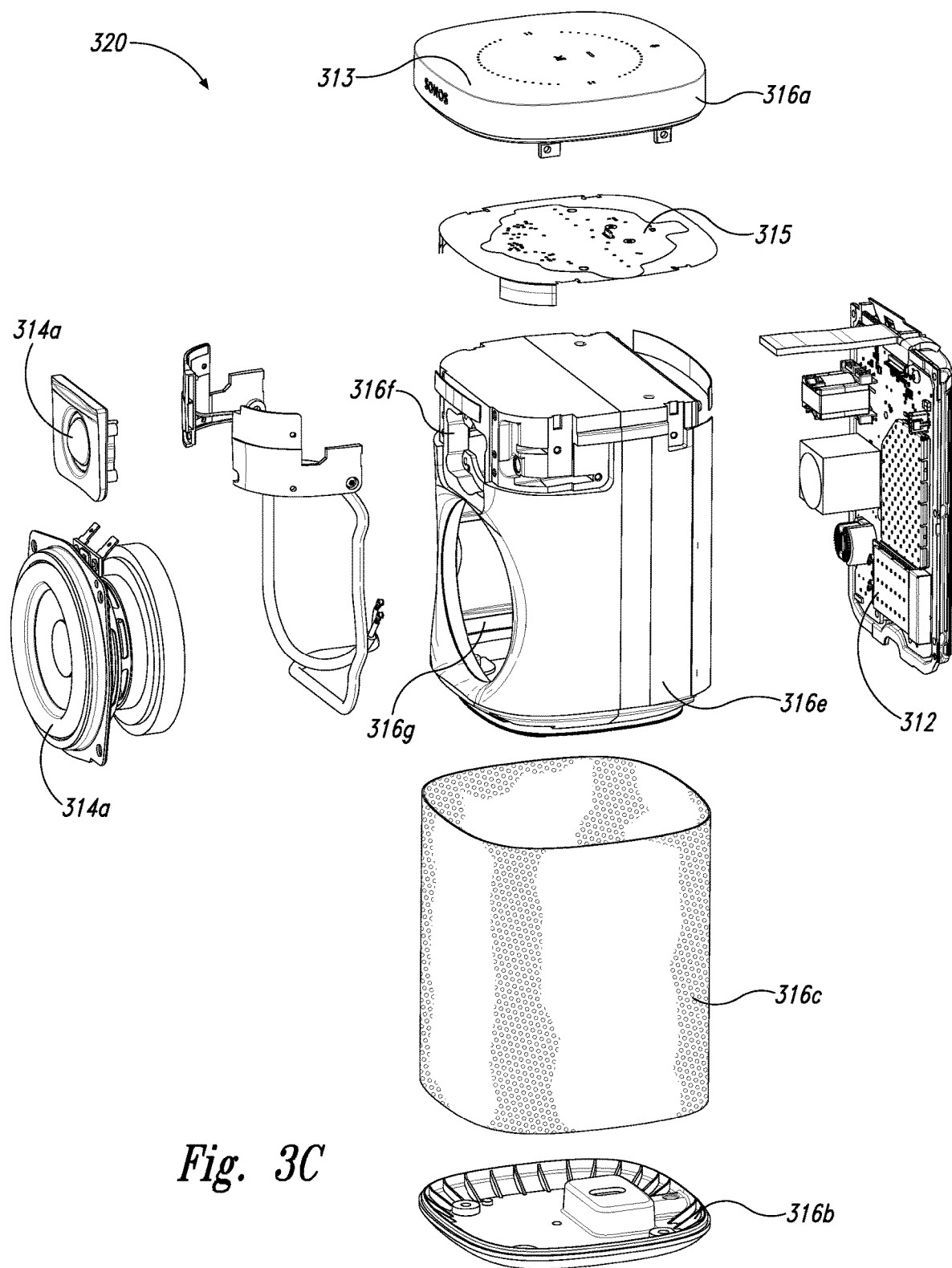
FIG. 3C shows an exploded view of the network microphone device of FIGS. 3A and 3B.
Figure 3D:
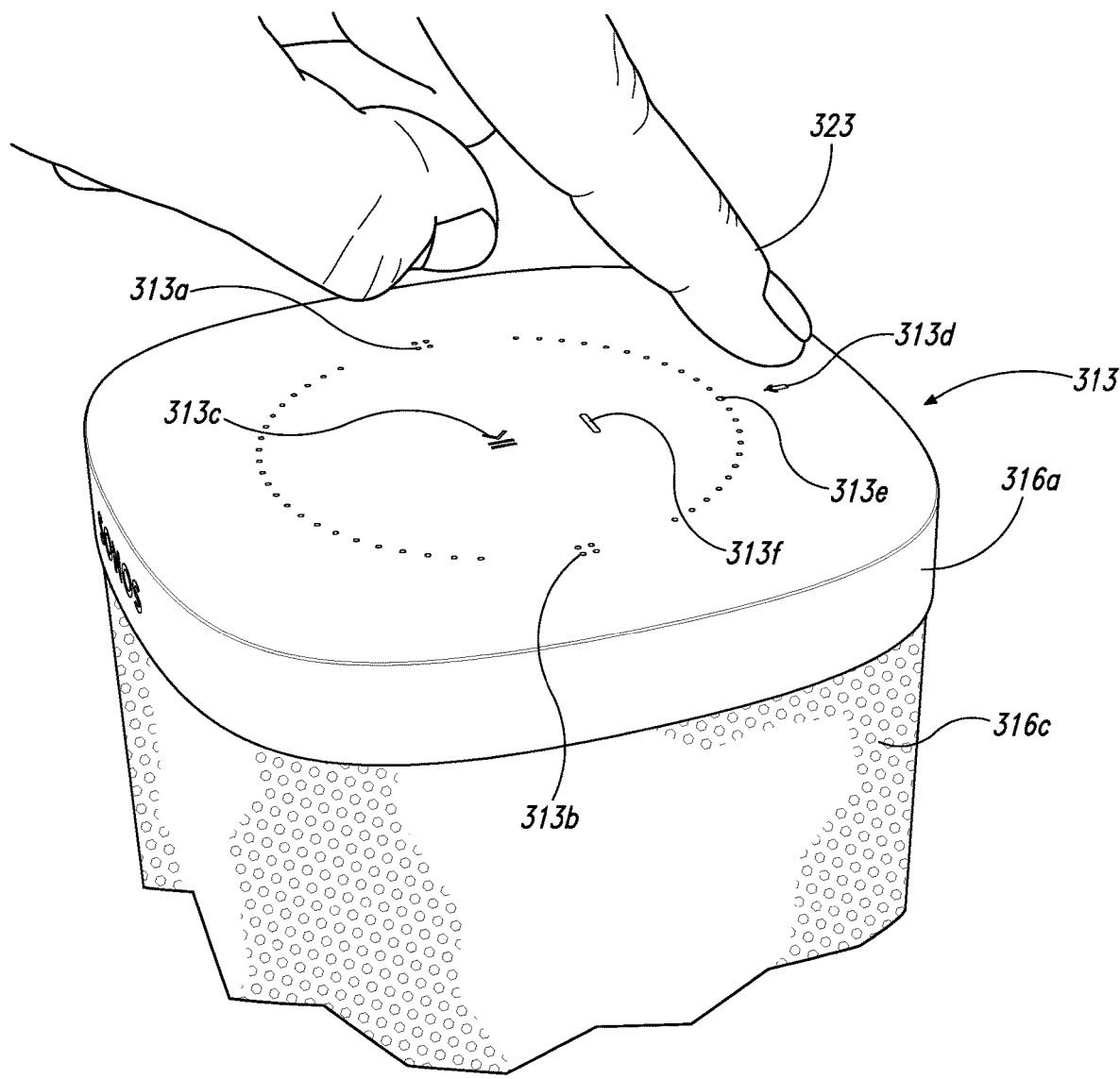
FIG. 3D shows an enlarged view of a portion of FIG. 3B.

FIGS. 3A and 3B are front and right isometric side views, respectively, of an NMD 320 configured in accordance with embodiments of the disclosed technology. FIG. 3C is an exploded view of the NMD 320. FIG. 3D is an enlarged view of a portion of FIG. 3B including a user interface 313 of the NMD 320. Referring first to FIGS. 3A-3C, the NMD 320 includes a housing 316 comprising an upper portion 316a, a lower portion 316b and an intermediate portion 316c (e.g., a grille). A plurality of ports, holes or apertures 316d in the upper portion 316a allow sound to pass through to one or more microphones 315 (FIG. 3C) positioned within the housing 316. The one or more microphones 316 are configured to received sound via the apertures 316d and produce electrical signals based on the received sound. In the illustrated embodiment, a frame 316e (FIG. 3C) of the housing 316 surrounds cavities 316f and 316g configured to house, respectively, a first transducer 314a (e.g., a tweeter) and a second transducer 314b (e.g., a mid-woofer, a midrange speaker, a woofer). In other embodiments, however, the NMD 320 includes a single transducer, or more than two (e.g., two, five, six) transducers. In certain embodiments, the NMD 320 omits the transducers 314a and 314b altogether.

Electronics 312 (FIG. 3C) includes components configured to drive the transducers 314a and 314b, and further configured to analyze audio content corresponding to the electrical signals produced by the one or more microphones 315. In some embodiments, for example, the electronics 312 comprises many or all of the components of the electronics 112 described above with respect to FIG. 1C. In certain embodiments, the electronics 312 includes components described above with respect to FIG. 1F such as, for example, the one or more processors 112a, the memory 112b, the software components 112c, the network interface 112d, etc. In some embodiments, the electronics 312 includes additional suitable components (e.g., proximity or other sensors).

Referring to FIG. 3D, the user interface 313 includes a plurality of control surfaces (e.g., buttons, knobs, capacitive surfaces) including a first control surface 313a (e.g., a previous control), a second control surface 313b (e.g., a next control), and a third control surface 313c (e.g., a play and/or pause control). A fourth control surface 313d is configured to receive touch input corresponding to activation and deactivation of the one or microphones 315. A first indicator 313e (e.g., one or more light emitting diodes (LEDs) or another suitable illuminator) can be configured to illuminate only when the one or more microphones 315 are activated. A second indicator 313f (e.g., one or more LEDs) can be configured to remain solid during normal operation and to blink or otherwise change from solid to indicate a detection of voice activity. In some embodiments, the user interface 313 includes additional or fewer control surfaces and illuminators. In one embodiment, for example, the user interface 313 includes the first indicator 313e, omitting the second indicator 313f. Moreover, in certain embodiments, the NMD 320 comprises a playback device and a control device, and the user interface 313 comprises the user interface of the control device.

Referring to FIGS. 3A-3D together, the NMD 320 is configured to receive voice commands from one or more adjacent users via the one or more microphones 315. As described above with respect to FIG. 1B, the one or more microphones 315 can acquire, capture, or record sound in a vicinity (e.g., a region within 10m or less of the NMD 320) and transmit electrical signals corresponding to the recorded sound to the electronics 312. The electronics 312 can process the electrical signals and can analyze the resulting audio data to determine a presence of one or more voice commands (e.g., one or more activation words). In some embodiments, for example, after detection of one or more suitable voice commands, the NMD 320 is configured to transmit a portion of the recorded audio data to another device and/or a remote server (e.g., one or more of the computing devices 106 of FIG. 1B) for further analysis. The remote server can analyze the audio data, determine an appropriate action based on the voice command, and transmit a message to the NMD 320 to perform the appropriate action. For instance, a user may speak "Sonos, play Michael Jackson." The NMD 320 can, via the one or more microphones 315, record the user's voice utterance, determine the presence of a voice command, and transmit the audio data having the voice command to a remote server (e.g., one or more of the remote computing devices 106 of FIG. 1B, one or more servers of a VAS and/or another suitable service). The remote server can analyze the audio data and determine an action corresponding to the command. The remote server can then transmit a command to the NMD 320 to perform the determined action (e.g., play back audio content related to Michael Jackson). The NMD 320 can receive the command and play back the audio content related to Michael Jackson from a media content source. As described above with respect to FIG. 1B, suitable content sources can include a device or storage communicatively coupled to the NMD 320 via a LAN (e.g., the network 104 of FIG. 1B), a remote server (e.g., one or more of the remote computing devices 106 of FIG. 1B), etc. In certain embodiments, however, the NMD 320 determines and/or performs one or more actions corresponding to the one or more voice commands without intervention or involvement of an external device, computer, or server.

Figure 3E:
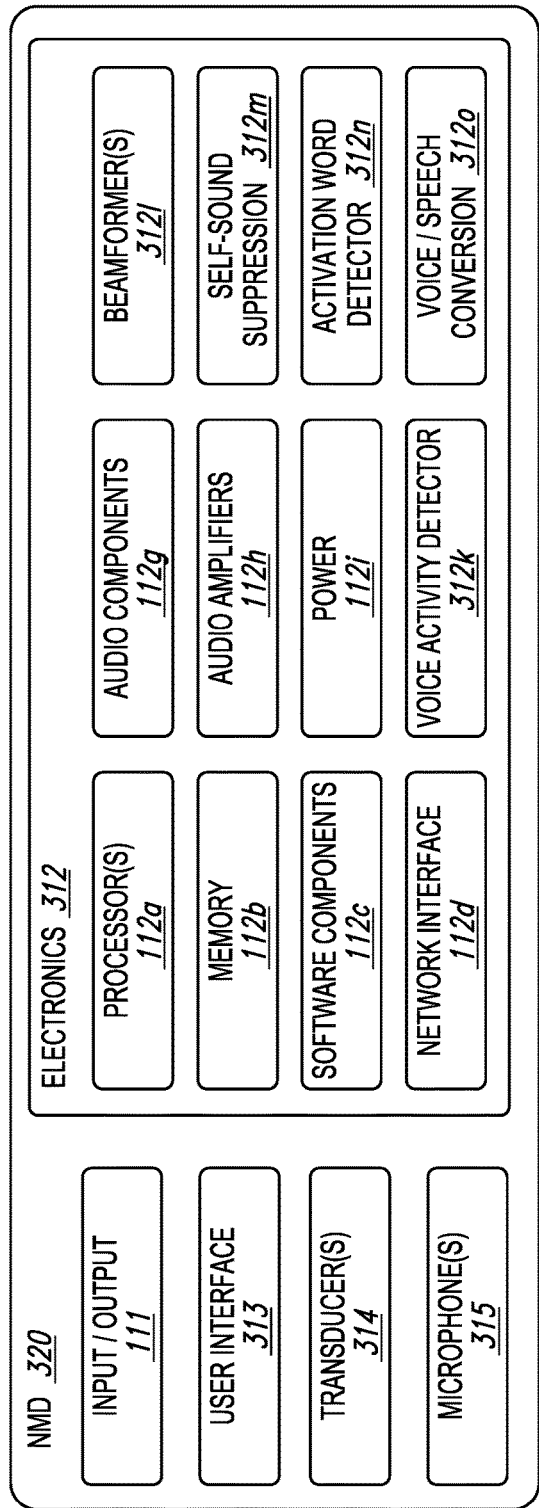
FIG. 3E shows a block diagram of the network microphone device of FIGS. 3A-3D

FIG. 3E is a functional block diagram showing additional features of the NMD 320 in accordance with aspects of the disclosure. The NMD 320 includes components configured to facilitate voice command capture including voice activity detector component(s) 312k, beam former components 312l, acoustic echo cancellation (AEC) and/or self-sound suppression components 312m, activation word detector components 312n, and voice/speech conversion components 312o (e.g., voice-to-text and text-to-voice). In the illustrated embodiment of FIG. 3E, the foregoing components 312k-312o are shown as separate components. In some embodiments, however, one or more of the components 312k-312o are subcomponents of the processors 112a.

The beamforming and self-sound suppression components 312l and 312m are configured to detect an audio signal and determine aspects of voice input represented in the detected audio signal, such as the direction, amplitude, frequency spectrum, etc. The voice activity detector activity components 312k are operably coupled with the beamforming and AEC components 312l and 312m and are configured to determine a direction and/or directions from which voice activity is likely to have occurred in the detected audio signal. Potential speech directions can be identified by monitoring metrics which distinguish speech from other sounds. Such metrics can include, for example, energy within the speech band relative to background noise and entropy within the speech band, which is measure of spectral structure. As those of ordinary skill in the art will appreciate, speech typically has a lower entropy than most common background noise. The activation word detector components 312n are configured to monitor and analyze received audio to determine if any activation words (e.g., wake words) are present in the received audio. The activation word detector components 312n may analyze the received audio using an activation word detection algorithm. If the activation word detector 312n detects an activation word, the NMD 320 may process voice input contained in the received audio. Example activation word detection algorithms accept audio as input and provide an indication of whether an activation word is present in the audio. Many first- and third-party activation word detection algorithms are known and commercially available. For instance, operators of a voice service may make their algorithm available for use in third-party devices. Alternatively, an algorithm may be trained to detect certain activation words. In some embodiments, the activation word detector 312n runs multiple activation word detection algorithms on the received audio simultaneously (or substantially simultaneously). As noted above, different voice services (e.g. AMAZON's ALEXA®, APPLE's SIRI®, or MICROSOFT's CORTANA®) can each use a different activation word for invoking their respective voice service. To support multiple services, the activation word detector 312n may run the received audio through the activation word detection algorithm for each supported voice service in parallel.

The speech/text conversion components 312o may facilitate processing by converting speech in the voice input to text. In some embodiments, the electronics 312 can include voice recognition software that is trained to a particular user or a particular set of users associated with a household. Such voice recognition software may implement voice-processing algorithms that are tuned to specific voice profile(s). Tuning to specific voice profiles may require less computationally intensive algorithms than traditional voice activity services, which typically sample from a broad base of users and diverse requests that are not targeted to media playback systems.

Figure 3F:
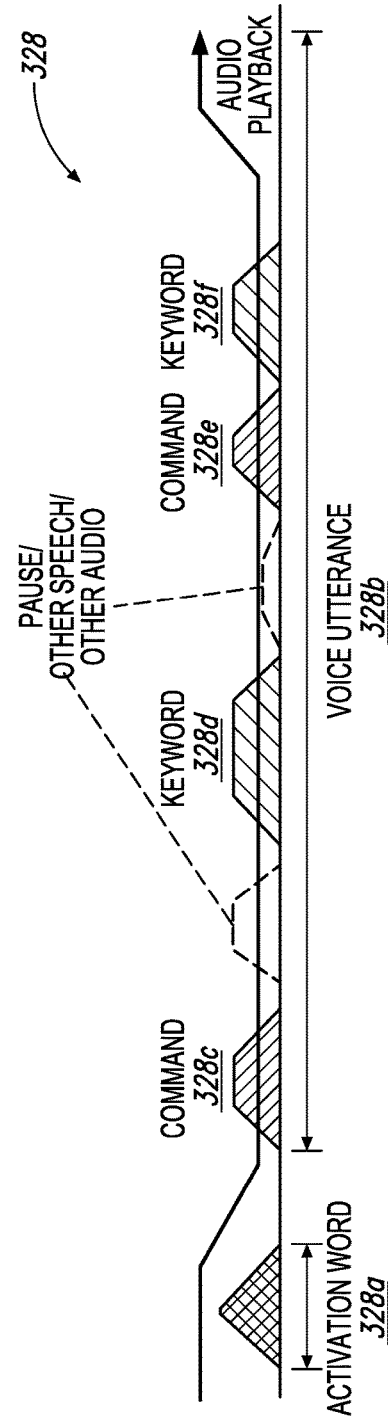
FIG. 3F shows a schematic diagram of an example voice input.

FIG. 3F is a schematic diagram of an example voice input 328 captured by the NMD 320 in accordance with aspects of the disclosure. The voice input 328 can include a activation word portion 328a and a voice utterance portion 328b. In some embodiments, the activation word 557a can be a known activation word, such as "Alexa," which is associated with AMAZON's ALEXA®. In other embodiments, however, the voice input 328 may not include a activation word. In some embodiments, a network microphone device may output an audible and/or visible response upon detection of the activation word portion 328a. In addition or alternately, an NMB may output an audible and/or visible response after processing a voice input and/or a series of voice inputs.

The voice utterance portion 328b may include, for example, one or more spoken commands (identified individually as a first command 328c and a second command 328e) and one or more spoken keywords (identified individually as a first keyword 328d and a second keyword 328f). In one example, the first command 328c can be a command to play music, such as a specific song, album, playlist, etc. In this example, the keywords may be one or words identifying one or more zones in which the music is to be played, such as the Living Room and the Dining Room shown in FIG. 1A. In some examples, the voice utterance portion 328b can include other information, such as detected pauses (e.g., periods of non-speech) between words spoken by a user, as shown in FIG. 3F. The pauses may demarcate the locations of separate commands, keywords, or other information spoke by the user within the voice utterance portion 328b.

In some embodiments, the media playback system 100 is configured to temporarily reduce the volume of audio content that it is playing while detecting the activation word portion 557a. The media playback system 100 may restore the volume after processing the voice input 328, as shown in FIG. 3F. Such a process can be referred to as ducking, examples of which are disclosed in U.S. patent application Ser. No. 15/438,749, incorporated by reference herein in its entirety.

Figure 4A:
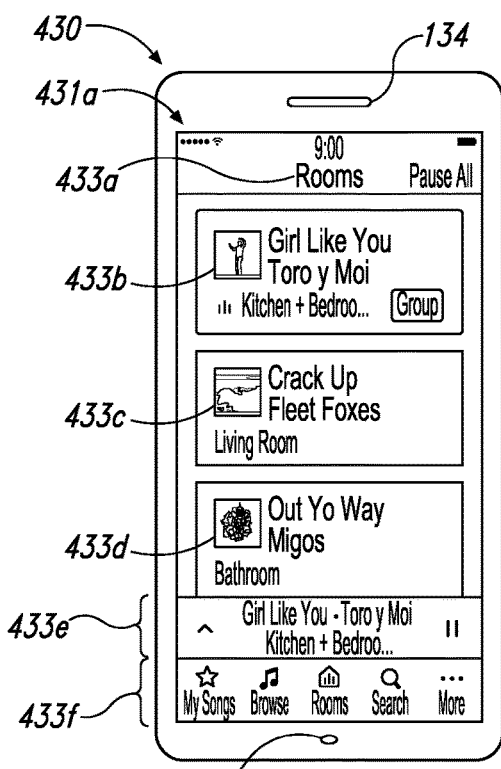
FIGS. 4A-4D show schematic diagrams of a control device in various stages of operation in accordance with aspects of the disclosed technology.
Figure 4B:
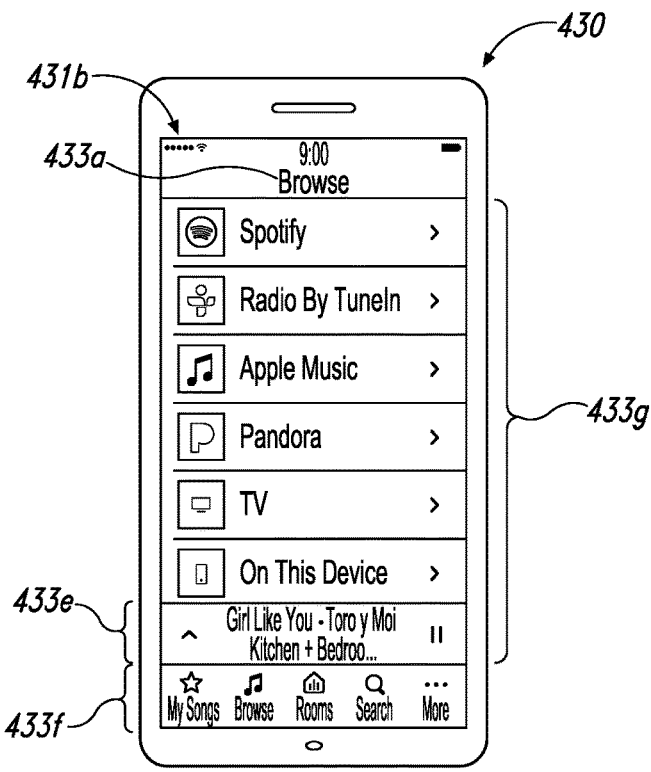
Figure 4C:
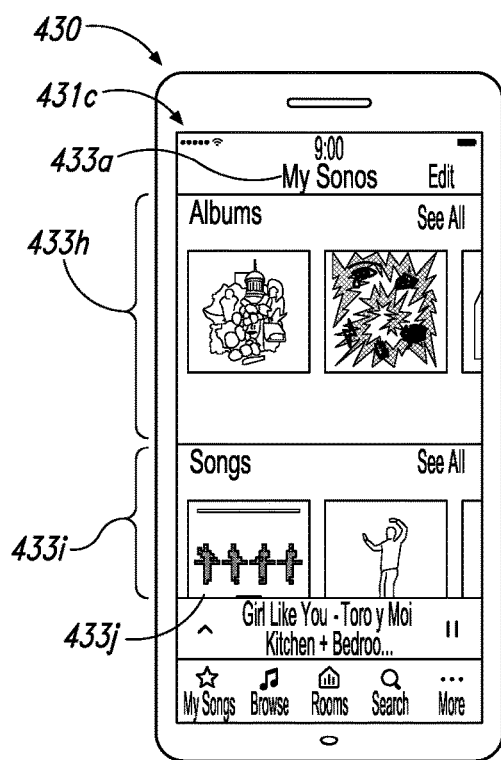
Figure 4D:
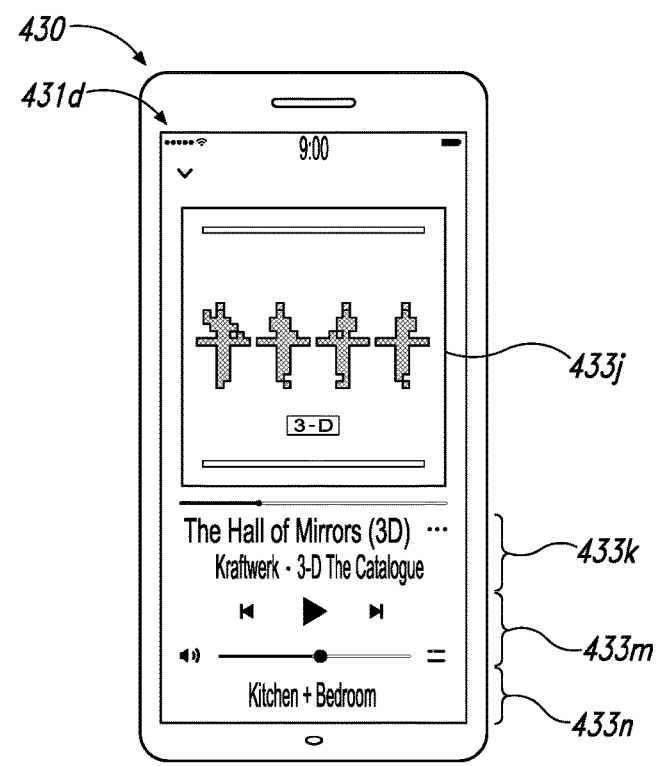

FIGS. 4A-4D are schematic diagrams of a control device 430 (e.g., the control device 130a of FIG. 1H, a smartphone, a tablet, a dedicated control device, an IoT device, and/or another suitable device) showing corresponding user interface displays in various states of operation. A first user interface display 431a (FIG. 4A) includes a display name 433a (i.e., "Rooms"). A selected group region 433b displays audio content information (e.g., artist name, track name, album art) of audio content played back in the selected group and/or zone. Group regions 433c and 433d display corresponding group and/or zone name, and audio content information audio content played back or next in a playback queue of the respective group or zone. An audio content region 433e includes information related to audio content in the selected group and/or zone (i.e., the group and/or zone indicated in the selected group region 433b). A lower display region 433f is configured to receive touch input to display one or more other user interface displays. For example, if a user selects "Browse" in the lower display region 433f, the control device 430 can be configured to output a second user interface display 431b (FIG. 4B) comprising a plurality of music services 433g (e.g., Spotify, Radio by Tunein, Apple Music, Pandora, Amazon, TV, local music, line-in) through which the user can browse and from which the user can select media content for play back via one or more playback devices (e.g., one of the playback devices 110 of FIG. 1A). Alternatively, if the user selects "My Sonos" in the lower display region 433f, the control device 430 can be configured to output a third user interface display 431c (FIG. 4C). A first media content region 433h can include graphical representations (e.g., album art) corresponding to individual albums, stations, or playlists. A second media content region 433i can include graphical representations (e.g., album art) corresponding to individual songs, tracks, or other media content. If the user selections a graphical representation 433j (FIG. 4C), the control device 430 can be configured to begin play back of audio content corresponding to the graphical representation 433j and output a fourth user interface display 431d fourth user interface display 431d includes an enlarged version of the graphical representation 433j, media content information 433k (e.g., track name, artist, album), transport controls 433m (e.g., play, previous, next, pause, volume), and indication 433n of the currently selected group and/or zone name.

Figure 5:
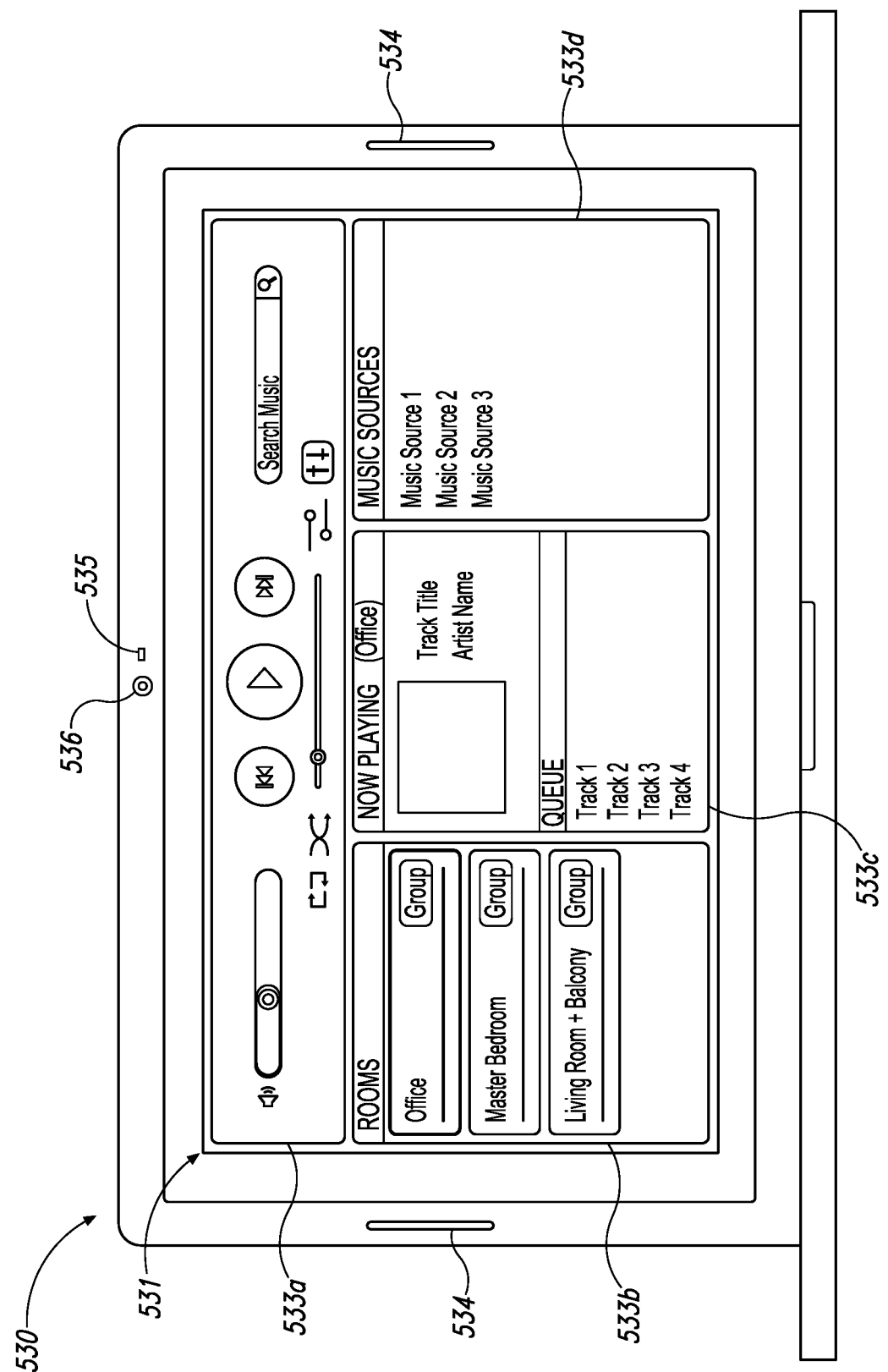
FIG. 5 shows front view of a control device.

FIG. 5 is a schematic diagram of a control device 530 (e.g., a laptop computer, a desktop computer). The control device 530 includes transducers 534, a microphone 535, and a camera 536. A user interface 531 includes a transport control region 533a, a playback status region 533b, a playback zone region 533c, a playback queue region 533d, and a media content source region 533e. The transport control region comprises one or more controls for controlling media playback including, for example, volume, previous, play/pause, next, repeat, shuffle, track position, crossfade, equalization, etc. The audio content source region 533e includes a listing of one or more media content sources from which a user can select media items for play back and/or adding to a playback queue.

The playback zone region 533b can include representations of playback zones within the media playback system 100 (FIGS. 1A and 1B). In some embodiments, the graphical representations of playback zones may be selectable to bring up additional selectable icons to manage or configure the playback zones in the media playback system, such as a creation of bonded zones, creation of zone groups, separation of zone groups, renaming of zone groups, etc. In the illustrated embodiment, a "group" icon is provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone can be configured to play audio content in synchrony with the playback device(s) in the particular zone. Analogously, a "group" icon may be provided within a graphical representation of a zone group. In the illustrated embodiment, the "group" icon may be selectable to bring up options to deselect one or more zones in the zone group to be removed from the zone group. In some embodiments, the control device 530 includes other interactions and implementations for grouping and ungrouping zones via the user interface 531. In certain embodiments, the representations of playback zones in the playback zone region 533b can be dynamically updated as playback zone or zone group configurations are modified.

The playback status region 533c includes graphical representations of audio content that is presently being played, previously played, or scheduled to play next in the selected playback zone or zone group. The selected playback zone or zone group may be visually distinguished on the user interface, such as within the playback zone region 533b and/or the playback queue region 533d. The graphical representations may include track title, artist name, album name, album year, track length, and other relevant information that may be useful for the user to know when controlling the media playback system 100 via the user interface 531.

The playback queue region 533d includes graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device. In some embodiments, for example, a playlist can be added to a playback queue, in which information corresponding to each audio item in the playlist may be added to the playback queue. In some embodiments, audio items in a playback queue may be saved as a playlist. In certain embodiments, a playback queue may be empty, or populated but "not in use" when the playback zone or zone group is playing continuously streaming audio content, such as Internet radio that may continue to play until otherwise stopped, rather than discrete audio items that have playback durations. In some embodiments, a playback queue can include Internet radio and/or other streaming audio content items and be "in use" when the playback zone or zone group is playing those items.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped.

Figure 6:
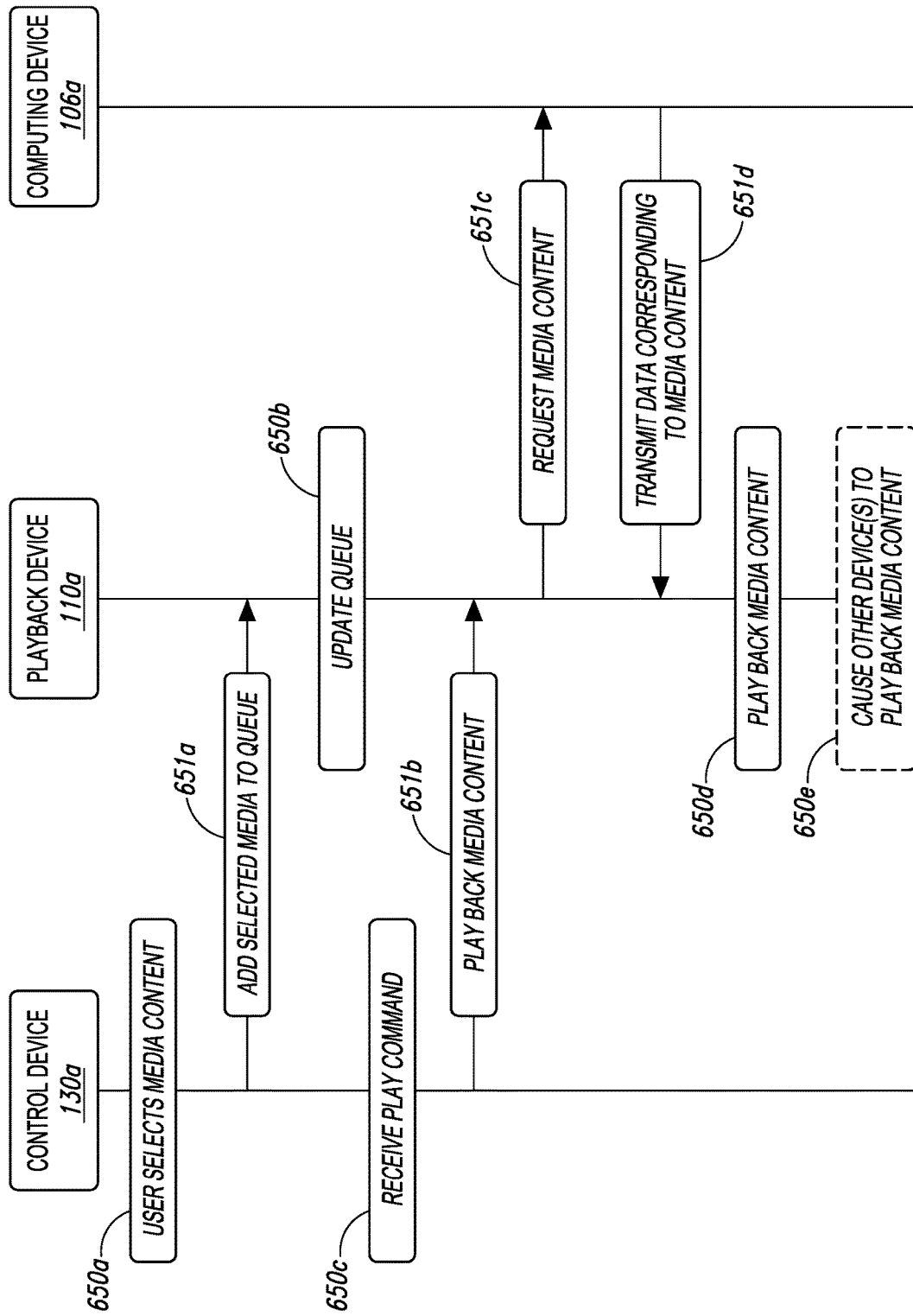
FIG. 6 shows a message flow diagram of a media playback system.

FIG. 6 is a message flow diagram illustrating data exchanges between devices of the media playback system 100 (FIGS. 1A-1M).

At step 650a, the media playback system 100 receives an indication of selected media content (e.g., one or more songs, albums, playlists, podcasts, videos, stations) via the control device 130a. The selected media content can comprise, for example, media items stored locally on or more devices (e.g., the audio source 105 of FIG. 1C) connected to the media playback system and/or media items stored on one or more media service servers (one or more of the remote computing devices 106 of FIG. 1B). In response to receiving the indication of the selected media content, the control device 130a transmits a message 651a to the playback device 110a (FIGS. 1A-1C) to add the selected media content to a playback queue on the playback device 110a.

At step 650b, the playback device 110a receives the message 651a and adds the selected media content to the playback queue for play back.

At step 650c, the control device 130a receives input corresponding to a command to play back the selected media content. In response to receiving the input corresponding to the command to play back the selected media content, the control device 130a transmits a message 651b to the playback device 110a causing the playback device 110a to play back the selected media content. In response to receiving the message 651b, the playback device 110a transmits a message 651c to the first computing device 106a requesting the selected media content. The first computing device 106a, in response to receiving the message 651c, transmits a message 651d comprising data (e.g., audio data, video data, a URL, a URI) corresponding to the requested media content.

At step 650d, the playback device 110a receives the message 651d with the data corresponding to the requested media content and plays back the associated media content.

At step 650e, the playback device 110a optionally causes one or more other devices to play back the selected media content. In one example, the playback device 110a is one of a bonded zone of two or more players (FIG. 1M). The playback device 110a can receive the selected media content and transmit all or a portion of the media content to other devices in the bonded zone. In another example, the playback device 110a is a coordinator of a group and is configured to transmit and receive timing information from one or more other devices in the group. The other one or more devices in the group can receive the selected media content from the first computing device 106a, and begin playback of the selected media content in response to a message from the playback device 110a such that all of the devices in the group play back the selected media content in synchrony.

IV. Overview of Example Embodiments

As summarized above, playback groups comprising portable, battery-powered playback devices that can transmit and receive audio content among themselves and also receive audio content from an audio source without a need for a WiFi LAN infrastructure are desirable for at least the reasons that (i) operating without requiring a WiFi LAN infrastructure requires less networking hardware than embodiments that require a WiFi LAN infrastructure, and allows listeners to enjoy group playback in situations where a WiFi LAN infrastructure may not be available, and (ii) group members can be repositioned quickly and easily in a listening environment to accommodate the preferences and/or locations of listeners.

In some embodiments, a playback group includes a group coordinator and one or more group members, where the group coordinator and the group members are playback devices. In some embodiments, the group coordinator is or comprises a laptop computer, tablet computer, smartphone or other computing device, and the group members are playback devices, such as any of the playback devices disclosed herein.

In some embodiments, the group coordinator, in addition to performing other features and functions, (i) obtains audio content for playback via a first wireless transmission scheme between a local audio source (e.g., a smartphone) and the group coordinator and (ii) distributes the obtained audio content to the group members via a second wireless transmission scheme. For example, in some embodiments, the audio source transmits packets comprising audio content to the group coordinator via an Advanced Audio Distribution Profile (A2DP) Bluetooth link or any other transmission scheme or format now known or later developed that is suitable for transmitting packets of audio content. And in some embodiments, the group coordinator distributes the audio content to the group members via Connectionless Slave Broadcast (CSB) Bluetooth transmission or any other transmission scheme or format now known or later developed that is suitable to distributing audio content to multiple playback devices.

In some embodiments, the group coordinator additionally generates and transmits to the group members both (i) clock timing and (ii) playback timing for the audio content. In such embodiments, the group members use the clock timing and the playback timing to play audio in synchrony with each other. In embodiments where the group coordinator is configured to play audio in synchrony with the group members, the group coordinator and the group members all use the clock timing and playback timing to play the audio in synchrony with each other.

In some embodiments, the group coordinator may transmit the clock timing and/or the playback timing to the group members via CSB transmission or other suitable broadcast or multicast transmission. In some embodiments, the group coordinator may transmit the clock timing and/or the playback timing to the group members via one or more separate transmissions, which may be unicast, multicast, or broadcast. In some embodiments, the separate transmission may include a Bluetooth, Bluetooth Low Energy (BLE), or other type of transmission now know or later developed that is suitable for conveying signaling information.

In some embodiments, however, clock timing or some other common clock reference may be generated and provided by a device other than the group coordinator. For example, in some embodiments, the clock timing information may be provided by another group member or perhaps another device that is separate from the playback group.

V. Technical Features

In some embodiments, at least some aspects of the technical solutions derive from the technical structure and organization of the audio content, the playback timing, and clock timing information that the playback devices use to play audio content from audio sources in synchrony with each other or in some other groupwise fashion, including how playback devices generate playback timing based on clock timing and play audio content based on playback timing and clock timing.

Therefore, to aid in understanding certain aspects of the disclosed technical solutions, certain technical details of the audio content, playback timing, and clock timing information, as well as how playback devices generate and/or use playback timing and clock timing for playing audio content are described below. Except where noted, the technical details of the audio content, playback timing, and clock timing information described below are the same or at least substantially the same for the examples shown and described herein with reference to FIGS. 7 and 8.

a. Audio Content

Audio content may be any type of audio content now known or later developed. For example, in some embodiments, the audio content includes any one or more of: (i) streaming music or other audio obtained from a streaming media service, such as Spotify, Pandora, or other streaming media services; (ii) streaming music or other audio from a local music library, such as a music library stored on a user's laptop computer, desktop computer, smartphone, tablet, home server, or other computing device now known or later developed; (iii) audio content associated with video content, such as audio associated with a television program or movie received from any of a television, set-top box, Digital Video Recorder, Digital Video Disc player, streaming video service, or any other source of audio-visual media content now known or later developed; (iv) text-to-speech or other audible content from a voice assistant service (VAS), such as Amazon Alexa or other VAS services now known or later developed; (v) audio content from a doorbell or intercom system such as Nest, Ring, or other doorbells or intercom systems now known or later developed; and/or (vi) audio content from a telephone, video phone, video/teleconferencing system or other application configured to allow users to communicate with each other via audio and/or video.

In some embodiments, a group coordinator (sometimes referred to as a "sourcing" device) obtains any of the aforementioned types of audio content from an audio source via an interface on the group coordinator, e.g., one of the group coordinator's network interfaces, a "line-in" analog interface, a digital audio interface, or any other interface suitable for receiving audio content in digital or analog format now known or later developed.

An audio source is any system, device, or application that generates, provides, or otherwise makes available any of the aforementioned audio content to a group coordinator or playback device. Examples of audio sources include streaming media (audio, video) services, digital media servers or other computing systems, voice assistant services (VAS), televisions, cable set-top-boxes, streaming media players (e.g., AppleTV, Roku, gaming console), CD/DVD players, doorbells, intercoms, telephones/smartphones, tablets, or any other source of audio content now known or later developed.

As mentioned earlier, a playback device that receives or otherwise obtains audio content from an audio source for playback and/or distribution to other playback devices in a playback group is sometimes referred to herein as the group coordinator or "sourcing" device for the playback group.

One function of the group coordinator of a playback group in some embodiments is to process received audio content for playback and/or distribution to group members of the playback group for groupwise playback. In some embodiments, the group coordinator transmits the processed audio content to all the other group members in the playback group. In some embodiments, the group coordinator transmits the audio content to a multicast network address, and all the group member playback devices configured to play the audio content (i.e., the group members of the playback group) receive the audio content via that multicast address. In some embodiments, the group coordinator broadcasts the audio content on a wireless channel and the group members in the playback group receive the broadcast. For example, in some embodiments, the group coordinator transmits the audio content to the group members via Connectionless Slave Broadcast (CSB) Bluetooth transmission.

In some embodiments, the group coordinator receives audio content from an audio source in digital form, e.g., via a stream of packets. In some embodiments, individual packets in the stream have a sequence number or other identifier that specifies an ordering of the packets. In operation, the group coordinator uses the sequence number or other identifier to detect missing packets and/or to reassemble the packets of the stream in the correct order before performing further processing. In some embodiments, the sequence number or other identifier that specifies the ordering of the packets is or at least comprises a timestamp indicating a time when the packet was created. The packet creation time can be used as a sequence number based on an assumption that packets are created in the order in which they should be subsequently played out. For example, in some embodiments, the group coordinator receives audio content from an audio source via an Advanced Audio Distribution Profile (A2DP) Bluetooth link.

In some embodiments, individual packets from an audio source may include both a timestamp and a sequence number. The timestamp is used to place the incoming packets of audio content in the correct order, and the sequence number is mainly used to detect packet losses. In operation, the sequence numbers increase by one for each Real-time Transport Protocol (RTP) packet transmitted from the audio source, and timestamps increase by the time "covered" by an RTP packet. In instances where a portion of audio content is split across multiple RTP packets, multiple RTP packets may have the same timestamp.

In some embodiments, the group coordinator does not change the sequence number or identifier (or timestamp, if applicable) of a received packet during processing. But in some embodiments, the group coordinator may reorder at least a first set of packets in a packet stream received from an audio source (an inbound stream) based on each packet's sequence identifier, extract audio content from the received packets, reassemble a bitstream of audio content from the received packets, and then repacketize the reassembled bitstream into an outbound set of packets (an outbound stream), where packets in the outbound stream have sequence numbers and/or timestamps that differ from the sequence numbers and/or timestamps of the packets in the first set of packets (or first stream).

In some embodiments, individual packets in the outbound stream may be a different length (i.e., shorter or longer) than individual packets in the inbound stream. In some embodiments, reassembling a bitstream from the incoming packet stream and then subsequently repacketizing the reassembled bitstream into a different set of packets facilitates uniform processing and/or transmission of audio content by the group coordinator and uniform processing by the group members that receive the audio content from the group coordinator.

However, for some delay-sensitive audio content, reassembly and repacketization may be undesirable, and therefore, in some embodiments, the group coordinator may not perform reassembly and repacketization for some (or all) audio content that it receives before playing the audio content and/or transmitting the audio content to other playback devices/group members.

b. Playback Timing

In some embodiments, the playback devices disclosed and described herein use playback timing to play audio content in synchrony with each other. An individual playback device can generate playback timing and/or playback audio content according to playback timing, based on the playback device's configuration in the playback group. The sourcing playback device (acting as a group coordinator) that generates the playback timing for audio content also transmits that generated playback timing to all the playback devices that are configured to play the audio content (the group members).

In some embodiments, the group coordinator transmits playback timing separately from the audio content. For example, and as described herein, in some embodiments, the group coordinator (i) transmits audio content to the group members via Connectionless Slave Broadcast (CSB) Bluetooth transmission and (ii) transmits playback timing for the audio content via a Bluetooth or Bluetooth Low Energy (BLE) transmission. In some embodiments, the group coordinator (i) transmits audio content to the group members via a first set of CSB transmissions, and (ii) transmits playback timing for the audio content to the group members via a second set of CSB transmissions. As explained herein, in some embodiments, some group members may receive audio content by "listening" to A2DP transmissions from an audio source to the group coordinator. The group members who receive audio content via the A2DP transmissions do not need receive that same audio content from a later CSB transmission, so those group members need not activate their radios to receive those later CSB transmissions. But if the group members know that the group coordinator will transmit playback timing information for audio content during a regularly scheduled (or semi-regularly scheduled) CSB transmission, the group members can activate their radios to receive the group coordinator's CSB transmissions comprising the playback timing but not activate their radios to receive the group coordinator's CSB transmissions comprising the audio content (unless a particular group member failed to receive a portion of audio content in an earlier A2DP transmission, in which case, that group member could activate its radio to receive later CSB transmissions from the group member to receive the missing (or perhaps corrupted) portion of audio content).

In some embodiments, the group coordinator transmits the playback timing to all the group members by transmitting the playback timing to a multicast network address for the playback group, and all the group members receive the playback timing via the playback group's multicast address. In some embodiments, the group coordinator transmits the playback timing to each group member by transmitting the playback timing to each group member's unicast network address.

In some Bluetooth-based embodiments, the group coordinator transmits the playback timing to all the group members by transmitting the playback timing to a set of group members via one or more of Bluetooth Connectionless Slave Broadcast (CSB) transmission, Active Slave Broadcast (ASB) transmission, LE Advertising Broadcast (ADVB) transmission, LE Periodic Advertising Broadcast (PADVB) transmission, or Broadcast Isochronous Stream (BIS) transmission. In some Bluetooth-based embodiments, the group coordinator transmits the playback timing to each group member individually via one or more of Bluetooth Synchronous Connection-Oriented (SCO) transmission, Bluetooth Enhanced Synchronous Connection-Oriented (eSCO) transmission, Bluetooth LE Asynchronous connection (LE ACL) transmission, or Bluetooth Connected Isochronous Stream (CIS) transmission.

In some embodiments, the playback timing is generated for individual frames (or packets) of audio content. In some embodiments, the audio content is packaged in a series of frames (or packets) where individual frames (or packets) comprise a portion of the audio content. In some embodiments, the playback timing for the audio content includes a playback time for each frame (or packet) of audio content. In some embodiments, the playback timing for an individual frame (or packet) is included within the frame (or packet), e.g., in the header of the frame (or packet), in an extended header of the frame (or packet), and/or in the payload portion of the frame (or packet). But as described earlier, in some embodiments, the group coordinator transmits playback timing for one or more individual frames separately from the audio content.

In some embodiments, the playback time for an individual frame (or packet) is identified within a timestamp or other indication. In such embodiments, the timestamp (or other indication) represents a time to play the one or more portions of audio content within that individual frame (or packet).

In operation, when the playback timing for an individual frame (or packet) is generated, the playback timing for that individual frame (or packet) is a future time relative to a current clock time of a reference clock at the time that the playback timing for that individual frame (or packet) is generated. As described in more detail below, the reference clock can be a "local" clock at the group coordinator or a "remote" clock at a separate network device, e.g., another playback device, a computing device, or another network device configured to provide clock timing for use by playback devices to generate playback timing and/or playback audio content.

In operation, a playback device tasked with playing particular audio content will play the portion(s) of the particular audio content within an individual frame (or packet) at the playback time specified by the playback timing for that individual frame (or packet), as adjusted to accommodate for differences between the clock timing information and a clock at the playback device that is tasked with playing the audio content, as describe in more detail below.

c. Clock Timing

The playback devices disclosed and described herein use clock timing to generate playback timing for audio content and to play the audio content based on the audio content and the generated playback timing.

In some embodiments, the group coordinator uses clock timing from a reference clock (e.g., a device clock, a digital-to-audio converter clock, a playback time reference clock, or any other clock) to generate playback timing for audio content that the group coordinator receives from an audio source. The reference clock can be a "local" clock at the group coordinator or a "remote" clock at a separate network device, e.g., another playback device, a computing device, or another network device configured to provide clock timing for use by (i) a group coordinator to generate playback timing and/or (ii) the group coordinator and group members to play back audio content.

In some embodiments, all of the playback devices tasked with playing particular audio content in synchrony (i.e., all the group members in a playback group) use the same clock timing from the same reference clock to play back that particular audio content in synchrony with each other. In some embodiments, playback devices use the same clock timing to play audio content that was used to generate the playback timing for the audio content. The reference clock may be a local clock of the group coordinator, but the reference clock could also be a clock at a different device, including a different playback device.

In operation, the device that generates the clock timing also transmits the clock timing to all the playback devices in the network that need to use the clock timing for generating playback timing and/or playing back audio content. In some embodiments, the device that generates the clock timing (e.g., the group coordinator in some embodiments) transmits the clock timing to a multicast network address, and all the playback devices configured to generate playback timing and/or play audio content (e.g., the group coordinator and/or the group members) receive the clock timing via that multicast address. In some embodiments, the device that generates the clock timing alternatively transmits the clock timing to each unicast network address of each playback device in the playback group.

In some embodiments, the device that generates the clock timing is a playback device configured to operate as the group coordinator for the playback group. And in operation, the group coordinator of the playback group transmits the clock timing to all the group members of the playback group. In some embodiments, the group coordinator transmits clock timing to group members via one or more CSB transmissions, Bluetooth Classic (i.e., Bluetooth Basic Rate/Extended Data Rate (BR/EDR)) or Bluetooth Low Energy (BLE) transmissions (e.g., BLE LE Advertising Broadcast (ADVB), LE Periodic Advertising Broadcast (PADVB), and Broadcast Isochronous Stream (BIS)), or via any other transmissions or transmission schemes suitable for transmitting clock timing information now known or later developed. In some embodiments, the group coordinator transmits instructions to the group members directing them to use or synchronize to a reference clock derived or received from an independent but reliable source (such as GPS or cellular network). And in some embodiments, the group coordinator and the group members all use the clock timing and the playback timing to play audio content in a groupwise manner. In some embodiments, the group coordinator and the group members all use the clock timing and the playback timing to play audio content in synchrony with each other.

d. Generating Playback Timing by the Group Coordinator

In some embodiments, the group coordinator: (i) generates playback timing for audio content based on clock timing from a local clock at the group coordinator, and (ii) transmits the generated playback timing to all the other group members in the playback group. In operation, when generating playback timing for an individual frame (or packet), the group coordinator adds a "timing advance" to the current clock time of a local clock at the group coordinator that the group coordinator is using for generating the playback timing.

In some embodiments, the "timing advance" is based on an amount of time that is greater than or equal to the sum of (i) the network transit time required for frames and/or packets comprising audio content transmitted from the group coordinator to arrive at all the other group members and (ii) the amount of time required for all the other group members to process received frames/packets from the group coordinator for playback.

In some embodiments, the group coordinator determines a timing advance by sending one or more test packets to one or more (or perhaps all) of the other group members, and then receiving test response packets back from those one or more group members. In some embodiments, the group coordinator and the one or more group members negotiate a timing advance via multiple test and response messages. In some embodiments with more than two group members, the group coordinator determines a timing advance by exchanging test and response messages with all of the group members, and then setting a timing advance that is sufficient for the group member having the longest total of network transit time and packet processing time.

In some embodiments, the timing advance is less than about 50 milliseconds. In some embodiments, the timing advance is less than about 20-30 milliseconds. And in still further embodiments, the timing advance is less than about 10 milliseconds. In some embodiments, the timing advance remains constant after being determined, or at least constant for the duration of a synchronous playback session. In other embodiments, the group coordinator can change the timing advance in response to a request from a group member indicating that a greater timing advance is required (e.g., because the group member is not receiving packets comprising portions of audio content until after one or more other group members have already played the portions of audio content) or a shorter timing advance would be sufficient (e.g., because the group member is buffering more packets comprising portions of audio content than necessary to provide consistent, reliable playback).

As described in more detail below, all the playback devices in a playback group configured to play the audio content in synchrony will use the playback timing and the clock timing to play the audio content in synchrony with each other.

e. Generating Playback Timing with Clock Timing from a Remote Clock

In some embodiments, the group coordinator may generate playback timing for audio content based on clock timing from a remote clock at another network device, e.g., another playback device, another computing device (e.g., a smartphone, laptop, media server, or other computing device configurable to provide clock timing sufficient for use by the group coordinator generate playback timing and/or playback audio content). Generating playback timing based on clock timing from a remote clock at another network device is more complicated than generating playback timing based on clock timing from a local clock in embodiments where the same clock timing is used for both (i) generating playback timing and (ii) playing audio content based on the playback timing.

In embodiments where the group coordinator generates playback timing for audio content based on clock timing from a remote cock, the playback timing for an individual frame (or packet) is based on (i) a "timing offset" between (a) a local clock at the group coordinator that the group coordinator uses for generating the playback timing and (b) the clock timing information from the remote reference clock, and (ii) a "timing advance" based on an amount of time that is greater than or equal to the sum of (a) the network transit time required for packets transmitted from the group coordinator to arrive at the group members and (b) the amount of time required for all of those group members to process frames and/or packets comprising audio content received from the group coordinator for playback.

For an individual frame (or packet) containing a portion(s) of the audio content, the group coordinator generates playback timing for that individual frame (or packet) by adding the sum of the "timing offset" and the "timing advance" to a current time of the local clock at the group coordinator that the group coordinator uses to generate the playback timing for the audio content. In operation, the "timing offset" may be a positive or a negative offset, depending on whether the local clock at the group coordinator is ahead of or behind the remote clock providing the clock timing. The "timing advance" is a positive number because it represents a future time relative to the local clock time, as adjusted by the "timing offset."

By adding the sum of the "timing advance" and the "timing offset" to a current time of the local clock at the group coordinator that the group coordinator is using to generate the playback timing for the audio content, the group coordinator is, in effect, generating the playback timing relative to the remote clock.

In some embodiments, and as described above, the "timing advance" is based on an amount of time that is greater than or equal to the sum of (i) the network transit time required for frames and/or packets comprising audio content transmitted from the group coordinator to arrive at all other group members and (ii) the amount of time required for all the other group members to process received frames/packets from the sourcing playback device for playback.

In some embodiments, the group coordinator determines a timing advance via signaling between the group coordinator and one or more group members, as described previously. Further, in some embodiments, the timing advance is less than about 50 milliseconds, less than about 20-30 milliseconds, or less than about 10 milliseconds, depending on the audio content playback latency requirements because different audio content may have different latency requirements. For example, audio content having associated video content may have lower latency requirements than audio content that does not have associated video content because audio content associating with video content must be synchronized with its corresponding video content whereas audio content that is not associated with video content need not be synchronized with any corresponding video content. In some embodiments, the timing advance remains constant after being determined, or at least constant for the duration of a playback session. And in some embodiments, the group coordinator can change the timing advance based on further signaling between the group coordinator (generating the playback timing) and one or more group members (that are using the playback timing to play audio content).

As described in more detail below, all the playback devices configured to play the audio content in synchrony will use the playback timing and the clock timing to play the audio content in synchrony with each other.

f. Playing Audio Content Using Local Playback Timing and Local Clock Timing

In some embodiments, the group coordinator is configured to play audio content in synchrony with one or more group members. And if the group coordinator is using clock timing from a local clock at the group coordinator to generate the playback timing, then the group coordinator will play the audio content using locally-generated playback timing and the locally-generated clock timing. In operation, the group coordinator plays an individual frame (or packet) comprising portions of the audio content when the local clock that the group coordinator used to generate the playback timing reaches the time specified in the playback timing for that individual frame (or packet).

For example, recall that when generating playback timing for an individual frame (or packet), the group coordinator device adds a "timing advance" to the current clock time of the reference clock used for generating the playback timing. In this instance, the reference clock used for generating the playback timing is a local clock at the group coordinator. So, if the timing advance for an individual frame is, for example, 30 milliseconds, then the group coordinator plays the portion (e.g., a sample or set of samples) of audio content in an individual frame (or packet) 30 milliseconds after creating the playback timing for that individual frame (or packet).

In this manner, the group coordinator plays audio content by using locally-generated playback timing and clock timing from a local reference clock at the group coordinator. By playing the portion(s) of the audio content of an individual frame and/or packet when the clock time of the local reference clock reaches the playback timing for that individual frame or packet, the group coordinator plays that portion(s) of the audio content in that individual frame and/or packet in synchrony with other group members in the playback group.

g. Playing Audio Content Using Local Playback Timing and Remote Clock Timing

As mentioned earlier, in some embodiments, a group coordinator generates playback timing for audio content based on clock timing from a remote clock, i.e., a clock at another network device separate from the group coordinator, e.g., another playback device, or another computing device (e.g., a smartphone, laptop, media server, or other computing device configurable to provide clock timing sufficient for use by a playback device generate playback timing and/or playback audio content). Because the group coordinator used clock timing from the remote clock to generate the playback timing for the audio content, the group coordinator also uses the clock timing from the remote clock to play the audio content. In this manner, the group coordinator plays audio content using the locally-generated playback timing and the clock timing from the remote clock.

Recall that, in embodiments where the group coordinator generates playback timing for audio content based on clock timing from a remote clock, the group coordinator generates the playback timing for an individual frame (or packet) based on (i) a "timing offset" based on a difference between (a) a local clock at the group coordinator and (b) the clock timing information from the remote clock, and (ii) a "timing advance" comprising an amount of time that is greater than or equal to the sum of (a) the network transit time required for frames/packets transmitted from the group coordinator to arrive at all the group members and (b) the amount of time required for all of the group members to process frames and/or packets comprising audio content received from the group coordinator for playback. And further recall that the group coordinator transmits the generated playback timing to all of the group members in the playback group tasked with playing the audio content in synchrony.

In this scenario, to play an individual frame (or packet) of audio content in synchrony with the one or more other group member playback devices, the group coordinator subtracts the "timing offset" from the playback timing for that individual frame (or packet) to generate a "local" playback time for playing the audio content based on the audio content within that individual frame (or packet). After generating the "local" playback time for playing the portion(s) of the audio content within the individual frame (or packet), the group coordinator plays the portion(s) of the audio content in the individual frame (or packet) when the local clock that the group coordinator is using to play the audio content reaches the "local" playback time for that individual frame (or packet). By subtracting the "timing offset" from the playback timing to generate the "local" playback time for an individual frame, the group coordinator effectively plays the portion(s) of audio content in that frame/packet with reference to the clock timing from the remote clock.

h. Playing Audio Content Using Remote Playback Timing and Local Clock Timing

Recall that, in some embodiments, the group coordinator transmits the audio content and the playback timing for the audio content to one or more group members. If the group member that receives (i.e., the receiving group member) the audio content and playback timing from the group coordinator is the same group member that provided clock timing information to the group coordinator that the group coordinator used for generating the playback timing, then the receiving group member in this instance plays audio content using the playback timing received from the group coordinator (i.e., remote playback timing) and the group member's own clock timing (i.e., local clock timing). Because the group coordinator used clock timing from a clock at the receiving group member to generate the playback timing, the receiving group member also uses the clock timing from its local clock to play the audio content. In this manner, the receiving group member plays audio content using the remote playback timing (i.e., from the group coordinator) and the clock timing from its local clock (i.e., its local clock timing).

To play an individual frame (or packet) of the audio content in synchrony with the group coordinator (and every other playback device that receives the playback timing from the group coordinator and clock timing from the receiving group member), the receiving group member (i) receives the frames (or packets) comprising the portions of the audio content from the group coordinator, (ii) receives the playback timing for the audio content from the group coordinator (e.g., in the frame and/or packet headers of the frames and/or packets comprising the portions of the audio content or perhaps separately from the frames and/or packets comprising the portions of the audio content), and (iii) plays the portion(s) of the audio content in the individual frame (or packet) when the local clock that the receiving group member used to generate the clock timing reaches the playback time specified in the playback timing for that individual frame (or packet) received from the group coordinator.

Because the group coordinator uses the "timing offset" (which is the difference between the clock timing at the receiving group member and the clock timing at the group coordinator in this scenario) when generating the playback timing, and because this "timing offset" already accounts for differences between timing at the group coordinator and the receiving group member, the receiving group member in this scenario plays individual frames (packets) comprising portions of the audio content when the receiving group member's local clock (that was used to generated the clock timing) reaches the playback time for an individual frame (or packet) specified in the playback timing for that individual frame (or packet).

And because the receiving group member plays frames (or packets) comprising portions of the audio content according to the playback timing, and because the group coordinator plays the same frames (or packets) comprising portions of the audio content according to the playback timing and the determined "timing offset," the receiving group member and the group coordinator play the same frames (or packets) comprising audio content in synchrony, i.e., at the same time or at substantially the same time.

i. Playing Audio Content Using Remote Playback Timing and Remote Clock Timing

Recall that, in some embodiments, the sourcing playback device (e.g., which in many cases may be the group coordinator) transmits the audio content and the playback timing for the audio content to one or more other playback devices in the synchrony group. And further recall that, in some embodiments, the network device providing the clock timing can be a different device than the playback device providing the audio content and playback timing (i.e., the sourcing playback device, which in many cases may be the group coordinator). Playback devices that receive the audio content, the playback timing, and the clock timing from one or more other devices are configured to playback the audio content using the playback timing from the device that provided the playback timing (i.e., remote playback timing) and clock timing from a clock at the device that provided the clock timing (i.e., remote clock timing). In this manner, the receiving group member playback device in this instance plays audio content by using remote playback timing and remote clock timing.

To play an individual frame (or packet) of the audio content in synchrony with every other playback device tasked with playing audio content in the playback group, the receiving playback device (i) receives the frames (or packets) comprising the portions of the audio content, (ii) receives the playback timing for the audio content (e.g., in the frame and/or packet headers of the frames and/or packets comprising the portions of the audio content or perhaps separately from the frames and/or packets comprising the portions of the audio content), (iii) receives the clock timing, and (iv) plays the portion(s) of the audio content in the individual frame (or packet) when the local clock that the receiving playback device uses for audio content playback reaches the playback time specified in the playback timing for that individual frame (or packet), as adjusted by a "timing offset."

In operation, after the receiving playback device receives clock timing, the receiving device determines a "timing offset" for the receiving playback device. This "timing offset" comprises (or at least corresponds to) a difference between the "reference" clock that was used to generate the clock timing and a "local" clock at the receiving playback device that the receiving playback device uses to play the audio content. In operation, each playback device that receives the clock timing from another device calculates its own "timing offset" based on the difference between its local clock and the clock timing, and thus, the "timing offset" that each playback device determines is specific to that particular playback device.

In some embodiments, when playing back the audio content, the receiving playback device generates new playback timing (specific to the receiving playback device) for individual frames (or packets) of audio content by adding the previously determined "timing offset" to the playback timing for each received frame (or packet) comprising portions of audio content. With this approach, the receiving playback device converts the playback timing for the received audio content into "local" playback timing for the receiving playback device. Because each receiving playback device calculates its own "timing offset," each receiving playback device's determined "local" playback timing for an individual frame is specific to that particular playback device.

And when the "local" clock that the receiving playback device is using for playing back the audio content reaches the "local" playback time for an individual frame (or packet), the receiving playback device plays the audio content (or portions thereof) associated with that individual frame (or packet). As described above, in some embodiments, the playback timing for a particular frame (or packet) is in the header of the frame (or packet). In other embodiments, the playback timing for individual frames (or packets) is transmitted separately from the frames (or packets) comprising the audio content.

Because the receiving playback device plays frames (or packets) comprising portions of the audio content according to the playback timing as adjusted by the "timing offset" relative to the clock timing, and because the device providing the playback timing generated the playback timing for those frames (or packets) relative to the clock timing and plays the same frames (or packets) comprising portions of the audio content according to the playback timing and its determined "timing offset," the receiving playback device and the device that provided the playback timing (e.g., the group coordinator in some embodiments) play the same frames (or packets) comprising the same portions of the audio content in synchrony with each other, i.e., at the same time or at substantially the same time.

VI. Example Embodiments

Figure 7:
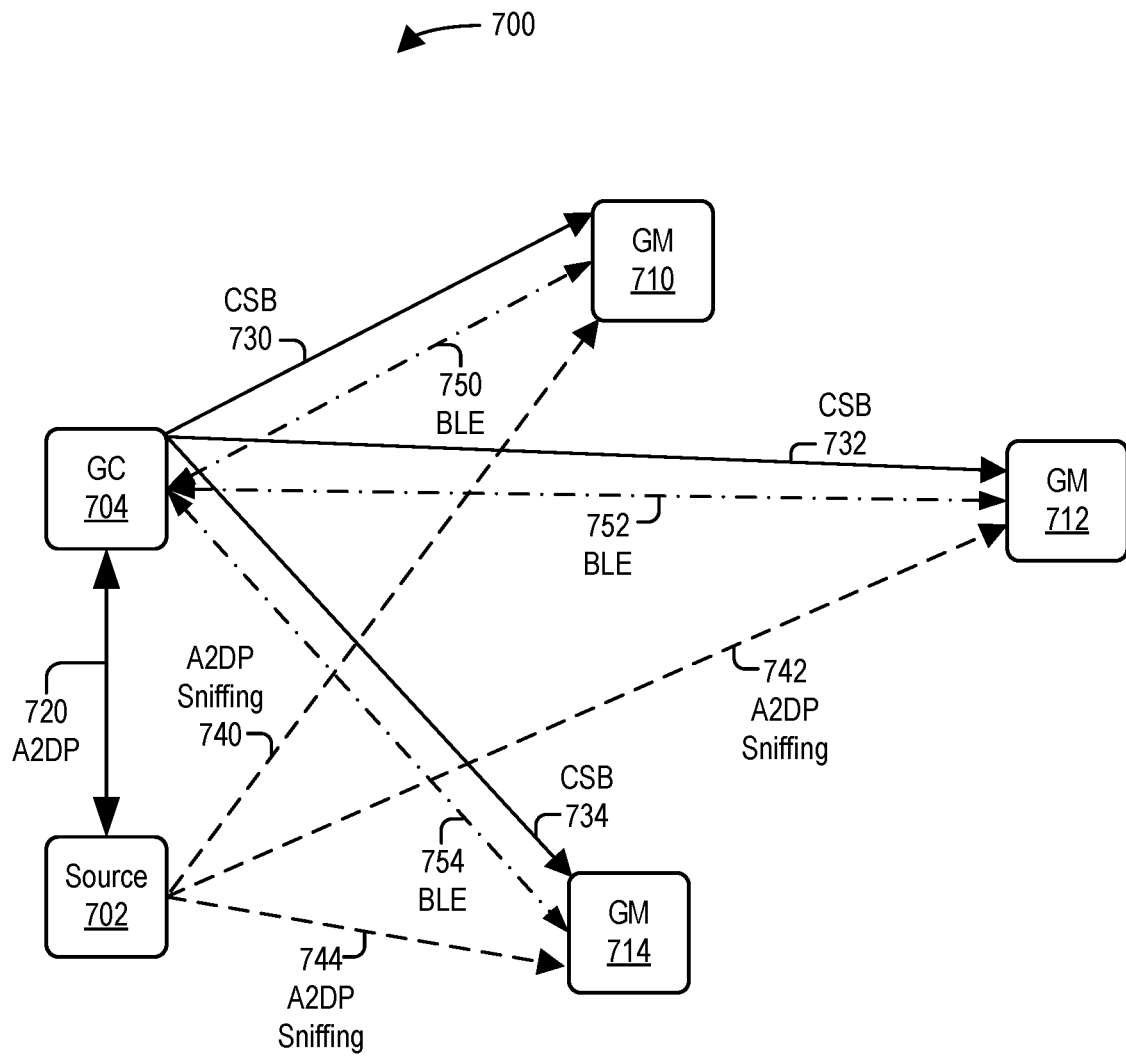
FIG. 7 shows an example configuration of a media playback system configured for hybrid sniffing and rebroadcast for Bluetooth networks according to some embodiments.

FIG. 7 shows an example configuration 700 of a media playback system configured for hybrid sniffing and rebroadcast in a network according to some embodiments. Although configure 700 shows a Bluetooth network as an example, the features and functions described herein are equally applicable to other networking protocols, too, including but not limited to network protocols for peer-to-peer, mesh, infrastructure, and/or ad-hoc networks.

The media playback system 700 in FIG. 7 includes playback devices 704, 710, 712, and 714. Playback device 704 is configured as a group coordinator (GC) and playback devices 710, 712, and 714 are configured as group members (GM). The playback devices 704, 710, 712, and 714 may be the same as or similar to any of the playback devices disclosed and described herein. In some embodiments, one or more of the playback devices 704, 710, 712, and 714 are portable, battery-powered wireless playback devices.

In the example shown in FIG. 7, the audio source 702 is a mobile audio source, such as a smartphone, tablet, or other mobile audio source. The audio source 702 transmits packets of audio content to the group coordinator 704. In example system 700, the audio source 702 transmits packets of audio content via an Advanced Audio Distribution Profile (A2DP) Bluetooth link 720. However, in some embodiments, the audio source 702 may transmit the audio content to the group coordinator 704 via another suitable communication link instead. The audio content may be any of the various types of audio content disclosed herein. In some embodiments, the audio content is in the form of streaming audio content from the audio source 702.

The group coordinator 704 (i) receives the audio content via the Advanced Audio Distribution Profile (A2DP) Bluetooth link 720 between the audio source 702 and the group coordinator 704 and (ii) distributes the obtained audio content to the group members 710, 712, and 714 via Connectionless Slave Broadcast (CSB) Bluetooth transmission to the group members 710, 712, and 714. That is, the audio content that the group coordinator 704 distributes to the group members 710, 712, and 714 is the same audio content that the group coordinator 704 obtains from the audio source 702. However, in some embodiments, the audio content may be packaged in differently-sized and/or differently-formatted packets or frames for the A2DP transmissions as compared to the CSB broadcasts.

In operation, the group coordinator 704 is configured to communicate with the audio source 702 via the A2DP link 720 during a first set of transmission time intervals (i.e., A2DP transmission time intervals) and configured to communicate with the group members 710, 712, and 714 via the CSB transmissions 730, 732, and 734 during a second set of transmission time intervals (i.e., CSB transmission time intervals). In some embodiments, individual A2DP transmission time intervals in the set of A2DP transmission time intervals do not overlap in time with individual CSB transmission time intervals in the set of CSB transmission time intervals. In operation, the A2DP and CSB transmission time intervals comprise alternating transmit time intervals, e.g., one or more A2DP transmit time intervals, followed by one or more CSB transmit time intervals, followed by one or more A2DP transmit time intervals, followed by one or more CSB transmit time intervals, and so on. In some embodiments, each alternate time interval is on the order of a few milliseconds to tens of milliseconds.

In some embodiments, the group coordinator includes a Bluetooth subsystem comprising a Baseband Resource Manager component (a physical or virtual component) that implements a scheduler configured to coordinate transmission times. In some embodiments, one or more of the group coordinator, group member(s), and/or audio source may use the Bluetooth Slot Availability Mask (SAM) feature, which allows a first device to inform a second device about times when the first device will not be able to communicate. In such embodiments, the group coordinator can use the SAM feature to inform the audio source of transmission time intervals (or similar transmission timeframes) that the group coordinator needs to reserve (or has reserved) for sending clock timing, audio content, and/or playback timing for audio content to group members. In some embodiments using the SAM feature, the audio source (individually or in combination with the group coordinator) can schedule its A2DP transmissions with the group coordinator so that the A2DP transmissions are not transmitted during the same transmission time intervals as the group coordinator's CSB transmissions (or Bluetooth Classic, BLE or other group coordinator to group member transmissions, depending on the implementation).

For illustration purposes, FIG. 7 shows the group coordinator 704 transmitting the audio content to the group members 710, 712, and 714 via separate CSB transmissions 730, 732, and 734, respectively. However, for CSB transmission, in practice, group coordinator 704 broadcasts the audio content via CSB transmissions that are received by each of the group members 710, 712, and 714 rather than separate CSB transmissions to each of the group members 710, 712, and 714. In some embodiments, the group coordinator 704 may distribute the audio content to the group members 710, 712, and 714 via one or more other and/or alternative transmission links suitable for distributing audio content to playback devices, including but not limited to, for example, Active Slave Broadcast (ASB), Bluetooth Low Energy (BLE), Infrastructure-based WiFi, ad-hoc WiFi, or Ultra-wideband (UWB).

Group coordinator 704 is also configured to transmit signaling and/or control information to individual group members 710, 712, and 714. In operation, the signaling and/or control information includes, but is not limited to, one or more of (i) playback timing information and clock timing information that the group members 710, 712, and 714 use to play the audio content in synchrony with the other playback devices in the playback group or (ii) other signaling information that the group members 710, 712, and 714 use to manage the setup and operation of the playback group, e.g., signaling for establishing which playback device should be the group coordinator, signaling for transferring the group coordinator responsibility from one playback device to another playback device, volume control for the playback devices in the playback group, playback control (e.g., start, stop, or pause playback), and/or signaling used to add new playback devices (not shown) to the playback group or drop any of the playback devices from the playback group.

The group coordinator 704 may transmit other signaling and/or control information to the group members 710, 712, and 714, too. For example, other signaling and/or control information includes, but is not limited to: (i) information about the A2DP link (or channel) between the group coordinator and the audio source and (ii) information about the CSB link (or channel) between the group coordinator and the group members. For an individual link (or channel), the communication configuration information may include one or more of (i) a channel or link identifier, (ii) a frequency hopping sequence for the channel or link, (iii) a security key to decode transmissions, and/or (iv) other channel or link parameters that may be required or desired for the group member to transmit and/or receive data via the channel/link.

In some embodiments, at least some of the above-described signaling and/or control information may be transmitted from the group coordinator 704 to the group members 710, 712, and 714 via the CSB transmissions. For example, in some embodiments, the group coordinator 704 may transmit playback timing and/or clock timing to the group members 710, 712, and 714 via the CSB transmissions.

In other embodiments, at least some of the above-described signaling and/or control information may be transmitted from the group coordinator 704 to the group members 710, 712, and 714 via a signaling channel that is separate from the CSB transmissions. For example, in some embodiments, the group coordinator 704 may transmit at least some of the signaling and/or control information to the group members 710, 712, and 714 via Bluetooth Classic and/or Bluetooth Low Energy (BLE) transmission channels 750, 752, and 754, respectively. For example, in some embodiments, the group coordinator 704 may transmit playback timing and/or clock timing to the group members 710, 712, and 714 via the Bluetooth Classic and/or BLE transmission channels 750, 752, and 754, respectively.

In still further embodiments, the group coordinator 704 may inform or instruct the group members to use clock timing from a remote source, such as a Global Positioning System (GPS), cellular, or Ultra-Wide Band (UWB) signal comprising clock timing information. In such embodiments, the group coordinator and the group members all use the same clock timing information from the same source. In such embodiments, the group coordinator and group members treat the clock timing information from the GPS, cellular, or UWB signal as remote clock timing, as described earlier.

Additionally, because CSB provides for only unidirectional transmission from the group coordinator 704 to the group members 710, 712, and 714, the group members 710, 712, and 714 may also transmit signaling and/or control information back to the group coordinator 704 via the Bluetooth and/or BLE links 750, 752, and 754. For example, in operation, if an individual group member fails to receive a packet of audio content from the group coordinator 704 or receives an errored packet that it is unable to correct, that individual group member may send a retransmit request to the group coordinator 704 asking the group coordinator 704 to resend the missing or errored packet. In response, the group coordinator 704 may retransmit the missing or errored packet to all the group members via a CSB transmission. Alternatively, the group coordinator 704 may transmit the missing or errored packet only to the individual group member that sent the retransmit request, e.g., via a direct Bluetooth or BLE link between the group coordinator 704 and that individual group member.

In still further embodiments, some of the above-described signaling and/or control information may be transmitted from the group coordinator 704 to the group members 710, 712, and 714 via the CSB transmissions, and some of the above-described signaling and/or control information may be transmitted from the group coordinator 704 to the group members 710, 712, and 714 via one or more separate signaling channels, e.g., BLE channels 750, 752, and 754.

In some embodiments, the group coordinator 704 may transmit at least some of the signaling and/or control information via both the CSB channel and the BLE channels. And in operation, the group members 710, 712, and 714 may receive at least some signaling and/or control information via either (or both) of the CSB channel and the BLE channels.

For example, in the embodiment shown in FIG. 7, the group coordinator 704 transmits audio content to the group members 710, 712, and 714 via a broadcast CSB transmission, and the group coordinator 704 transmits clock timing information and playback timing for the audio content to the group members 710, 712, and 714 via BLE transmission links 750, 752, and 754, respectively. In some embodiments, the group coordinator 704 transmits the audio content and the playback timing for the audio content to the group members 710, 712, and 714 via the CSB transmission, and the group coordinator 704 transmits the clock timing and a copy of the playback timing to the group members 710, 712, and 714 via the BLE transmission links 750, 752, and 754. In some embodiments, the playback timing that the group coordinator 704 transmits to the group members 710, 712, and 714 is a subset of the playback timing that group coordinator transmits to the group members 710, 712, and 714 for the BLE transmission links 750, 752, and 754.

In some embodiments, each packet of audio content that the audio source 702 transmits to the group coordinator 704 includes a timestamp and/or sequence identifier. Typically, a packet's timestamp corresponds to a time that the packet was created at the audio source 702 or perhaps a time that the packet was transmitted from the audio source 702 to the group coordinator 704. And a packet's sequence identifier typically corresponds to that packet's sequence number in a stream of packets.

Although neither the timestamp nor sequence identifier specifies a playback time, the group coordinator 704 in some embodiments can use the timestamp and/or the sequence identifier to facilitate the distribution of playback timing to the group members 710, 712, and 714.

For example, in some embodiments, the playback timing information generated by the group coordinator 704 for an individual packet of audio content includes both (i) the playback time for the packet, which as described earlier, is a future time relative to a current clock time of a reference clock that is used to generate the playback timing and (ii) the timestamp and/or sequence identifier of that individual packet. In such embodiments, each individual packet of audio content that that the group coordinator 704 transmits to the group members 710, 712, and 714 also includes the timestamp and/or sequence identifier of that individual packet. In this manner, each packet's timestamp and/or sequence identifier enables each group member to match each individual packet with its corresponding playback time.

In such embodiments, because each individual packet of audio content transmitted by the audio source 702 via the A2DP link 720 includes a timestamp (and/or a sequence identifier), and because the group coordinator 704 distributes each individual packet of audio content via the CSB transmissions with the same timestamp (and/or sequence identifier) received from the audio source 702 (i.e., the group coordinator 704 does not remove the timestamp (and/or sequence identifier) provided by the audio source 702), each packet of audio content that a group member receives will include both (i) audio content and (ii) a timestamp (and/or sequence identifier) for that audio content—regardless of whether the group member receives that audio packet from the audio source 702 (e.g., by sniffing the A2DP transmissions 720 from the audio source 702 to the group coordinator 704) or from the group coordinator 704 (e.g., via the CSB transmissions from the group coordinator 704 to the group members 710, 710, and 712).

And in embodiments where the playback timing information for a packet of audio content includes the playback time for the packet and the packet's timestamp (and/or sequence identifier), a group member that receives the playback timing information from the group coordinator 704 can use each packet's timestamp (and/or sequence identifier) to match the packet with its playback time—regardless of whether the group member receives the playback timing information from the group coordinator 704 via the CSB broadcast or via a separate signaling link (e.g., a separate Bluetooth or BLE link). For example, in some embodiments, the group coordinator can transmit playback timing for a set of audio packets in the form of a playback timing schedule comprising playback times for a set of packets.

As described earlier, the audio source 702 transmits packets of audio content via the A2DP Bluetooth link 720. Typically, the A2DP transmissions from the audio source 702 to the group coordinator 704 are addressed to the group coordinator 704. But in some embodiments, the signaling and/or control information that the group coordinator 704 transmits to the group members 710, 712, and 714 includes information that enables the group members 710, 712, and 714 to also receive and decode the A2DP packets that the audio source 702 transmits to the group coordinator 704. For example, and as mentioned previously, in some embodiments the group coordinator 704 transmits communication configuration information to the group members 710, 712, and 714 that includes (i) information about the A2DP link (or channel) between the group coordinator 704 and the audio source 702 and (ii) information about the CSB link(s) (or channel(s)) between the group coordinator 704 and the group members 710, 712, and 714. For an individual link (or channel), the communication configuration information may include one or more of (i) a channel or link identifier, (ii) a frequency hopping sequence for the channel or link, (iii) a security key to decode transmissions, and/or (iv) other channel or link parameters that may be required or desired for the group member to transmit and/or receive data via the channel/link.

Enabling the group members 710, 712, and 714 to also receive and decode the A2DP packets sent from the audio source 702 and addressed to the group coordinator 704 allows each group member 710, 712, 714 to selectively receive either (i) packets comprising audio content received via the A2DP transmissions from the audio source 702 and addressed to the group coordinator 704 or (ii) packets comprising audio content received via the CSB transmissions from the group coordinator 704.

This scenario may be advantageous in situations where an individual portable, battery-powered group member is positioned in (or repositioned in) a listening area where it receives packets transmitted via the A2DP link from the audio source 702 to the group coordinator 704 at a higher receive power and/or higher signal-to-noise ratio than the packets transmitted by the group coordinator 704 via the CSB transmissions.

For example, if one group member 714 is in wireless reception range of the audio source 702, that group member 714 can use the communication configuration information for the A2DP link 720 to "listen" 744 to the transmissions on the A2DP link 720 during each A2DP transmission time interval. Individual transmissions on the A2DP link 720 include packets of audio content that the audio source 702 transmits to the group coordinator 704. If that group member 714 receives an individual packet of audio content via an A2DP transmission from the audio source 702 during an A2DP transmission time interval, then that group member 714 can save power by choosing to not activate its radio receiver to receive that same individual packet of audio content via a later CSB transmission 734 from the group coordinator 704 during a later CSB transmission time interval. In this manner, the group member 714 selectively receives and processes packets received via one of two streams of packets comprising audio content, e.g., where the first stream comprises the A2DP stream 720 from the audio source 702 to the group coordinator 704 and the second stream comprises the CSB stream 734 from the group coordinator 704 to the group member 714. But if group member 714 fails to receive one or more packets of audio content (or received one or more corrupted packets of audio content) by sniffing the A2DP link from the audio source 702 to the group coordinator 704, the group member 714 can activate its radio for at least enough future CSB transmission time intervals to receive the missing or corrupted packet(s) when the group coordinator 704 transmits those packets of audio content to the broadcast group comprising the group members 710, 712, and 714. In this manner, the group member 714 determines whether to receive packets from an A2DP transmission or a CSB transmission on a packet-by-packet basis.

In some embodiments, to selectively receive and/or process packets received via either the A2DP link or the CSB transmissions, the group member 714 implements a buffer (e.g., a ring buffer) configured to store packets comprising audio content, where each individual buffer entry corresponds to an upcoming local playback time at which the group member 714 will play the portion of audio content stored in that buffer entry. When the group member 714 receives a packet comprising a portion of audio content via the A2DP link, the group member 714 determines a local playback time for that portion of audio content and stores that portion of audio content in the buffer at a buffer entry corresponding to the upcoming playback time for that portion of audio content. Some embodiments may include additionally designating that portion of audio content as "valid" via a validity flag or similar indication in the buffer. For each buffer entry (corresponding to an upcoming local playback time), if the buffer entry contains a portion of audio content (and if that portion is indicated as "valid" for example), then the group member 714 can choose (and in some embodiments does choose) to not activate its radio for the transmission time interval during which the group coordinator 704 later transmits a packet (or packets) comprising that same portion of audio content. But if the buffer entry is empty (or if the data in the buffer entry is marked "invalid" for some reasons, e.g., the data is corrupt or contains errors), then the group member 714 can choose (and in some embodiments does choose) to activate its radio for the transmission time interval during which the group coordinator 704 later transmits a packet(s) comprising that same portion of audio content.

In some embodiments, the group member 714 selectively receiving and/or processing packets received via one of the two streams of packets comprising audio content additionally or alternatively includes the group member comparing one or more quality metrics for the A2DP transmissions with one or more corresponding quality metrics for the CSB transmissions. In operation, the one or more quality metrics include (i) a wireless SNR (Signal-to-Noise Ratio), (ii) a receive power at the first playback device, (iii) a BER (Bit Error Rate) or PER (Packet Error Rate), (iv) a transmission rate, (v) a RSSI (Received Signal Strength Indication), (vi) SINR (Signal-to-Interference-plus-Noise Ratio), and (vii) a PDR (Packet-Delivery Ratio).

In response to determining that one or more quality metrics for the A2DP transmissions are better than the corresponding one or more quality metrics for the CSB transmissions, the group member 714 selectively receives and/or processes the packets received via the A2DP transmissions from the audio source 702 and addressed to the group coordinator 704 rather than the packets received via the CSB transmissions from the group coordinator 704 and addressed to the group members 710, 712, and 714.

And in response to determining that one or more quality metrics for the CSB transmissions are better than one or more corresponding quality metrics for the A2DP transmissions, the group member 714 selectively receives and processes packets received via the CSB transmissions from the group coordinator 704 and addressed to the group members 710, 712, and 714 rather than the packets received via the A2DP transmissions from the audio source 702 and addressed to the group coordinator 704.

In some embodiments, the group member 714 selectively processing packets received via one of the two streams of packets additionally or alternatively includes the group member (i) storing data received via the A2DP transmissions in a first buffer and (ii) storing data received via the CSB transmissions in a second buffer. The group member 714 compares the quality of A2DP transmissions with the quality of the CSB transmissions. And if the wireless signal quality of the A2DP transmissions is better than the wireless signal quality of the CSB transmissions, then the group member 714 processes the packets stored in the first buffer. But if the wireless signal quality of the CSB transmissions is better than the wireless signal quality of the A2DP transmissions, then the group member 714 processes the packets stored in the second buffer. In some embodiments, the group member 714 may switch between processing data stored in the first buffer and processing data stored in the second buffer during audio content playback as the wireless signal quality of the first and second streams changes over time.

In some embodiments, one or more (or all) of the individual group members 710, 712, and 714 inform the group coordinator 704 which stream it is processing. In other words, an individual group member informs the group coordinator 704 whether the group member is obtaining the audio content for synchronous playback from (i) the packets received via the A2DP transmissions from the audio source 702 and addressed to the group coordinator 704 or (ii) from packets received via the CSB transmissions from the group coordinator 704 and addressed to the group members 710, 712, and 714.

In some embodiments, the group coordinator 704, individually or in combination with one or more of the group members 710, 712, and/or 714—or alternatively, one of the group members, individually or in combination with the group coordinator or one or more of the other group members—may determine that the role of the group coordinator should change from the current group coordinator 704 to one of the group members 710, 712, or 714 one or more reasons.

For example, as described earlier, a group coordinator's functions include: (i) receiving and processing audio content from the audio source, (ii) generating playback timing for the audio content, (iii) distributing the audio content, playback timing, and clock timing to all the group members, and (iv) playing audio based on the audio content, playback timing, and clock timing. And a group member's functions include: (i) receiving audio from at least one of the audio source or the group coordinator, (ii) receiving playback timing and clock timing from the group coordinator, and (iii) playing audio based on the audio content, playback timing, and clock timing. Because a playback device configured to perform the group coordinator role performs more computing and data transmission functions than a playback device configured to perform a group member role (e.g., generating playback timing for the audio content and distributing the audio content, playback timing and clock timing to the group members), a playback device configured to perform the group coordinator role will typically use more power than a similar (or the same type of) playback device configured to perform a group member role. For scenarios where the playback devices 704, 710, 712, and/or 714 are portable battery-powered playback devices, the playback device configured to perform the group coordinator role may consume battery power at a faster rate than other playback devices configured to perform as group members.

Therefore, the battery power level of the playback device configured to perform the group coordinator role falls below a certain threshold level, the playback device configured as the group coordinator may exchange control messages (comprising battery level or other power consumption-related information) with the playback devices configured as group members to determine whether the group coordinator role should be transferred to one of the group members that has a higher battery power level and/or lower power consumption rate. In some embodiments, transitioning the group coordinator role in this manner may allow a group of battery-powered playback devices to play audio together for a longer period of time as compared to a scenario where the playback device configured as the group coordinator simply exhausted its battery. In this manner, the playback devices can transfer the group coordinator role from playback device to playback device so that the burden of the group coordinator role is shared among multiple playback devices.

In another example, and as described earlier, the audio source and/or one or more playback devices may be relocated within and/or moved about a listening area. Moving and/or relocating the audio source and/or one or more playback devices within a listening area may affect the wireless transmission reliability of the system. For example, if moving the audio source and/or group coordinator results in the playback device configured as the group coordinator being positioned far from the audio source and/or certain group members, it may be advantageous to transition the group coordinator function to another playback device that is perhaps closer to the audio source and/or more centrally located to all the playback devices in the group. In some embodiments, the group coordinator exchanges control messages (e.g., comprising wireless network metrics) with the group members. These control messages may include information about one or more of device-to-device (i) wireless SNR (Signal-to-Noise Ratio), (ii) receive power, (iii) a BER (Bit Error Rate) or Packet Error Rate (PER), (iv) a transmission rate, (v) a RSSI (Received Signal Strength Indication), (vi) SINR (Signal-to-Interference-plus-Noise Ratio), and/or (vii) a PDR (Packet-Delivery Ratio).

For example, one or more of the playback devices may measure and/or assess one or more of the listed wireless metrics relative to one or more other playback devices in the group and/or the audio source to obtain an estimate of the wireless network topology. And based on the estimated wireless network topology, the group coordinator—individually or in combination with one or more group members—may decide that another playback device closer to the audio source and/or more centrally located within the estimated wireless network topology would be better suited to perform the group coordinator role. In this manner, the wireless reliability of the group as a whole may be improved by transitioning the group coordinator role to a playback device closer to the audio source and/or more centrally located in the group.

VII. Example Methods

Figure 8:
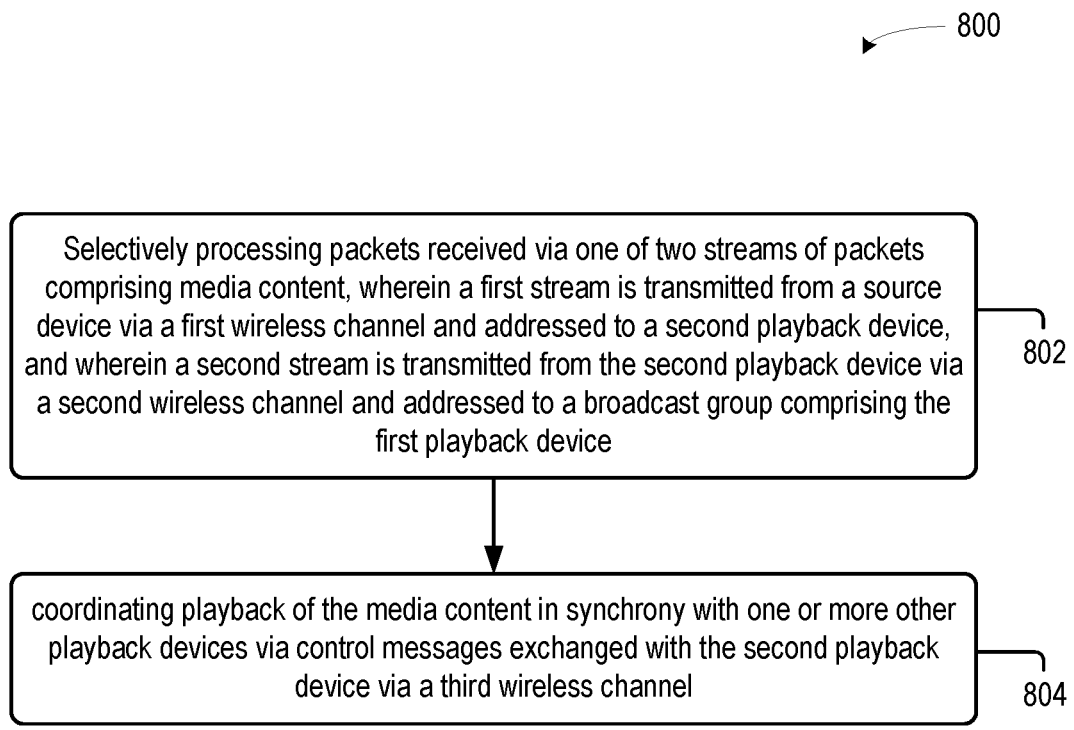
FIG. 8 shows an example method performed by a playback device configured for hybrid sniffing and rebroadcast for Bluetooth networks according to some embodiments.

FIG. 8 shows an example method 800 performed by a playback device configured for hybrid sniffing and rebroadcast in wireless networks, including Bluetooth networks, according to some embodiments. The playback device may be the same as or similar to any of the playback devices disclosed herein.

Method 800 begins at step 802, which includes the playback device selectively receiving and/or processing packets received via one of two streams of packets comprising media content, wherein a first stream is transmitted from a source device via a first wireless channel and addressed to a second playback device, and wherein a second stream is transmitted from the second playback device via a second wireless channel and addressed to a broadcast group comprising the first playback device.

In some embodiments, the source device is an audio source that is the same as or similar to any of the audio sources disclosed and described herein, including but not limited to audio source 702 (FIG. 7). And in some embodiments, the first playback device is configured to operate as a group member in a manner the same as or similar to any of group members 710, 712, and 714 (FIG. 7) described herein, and the second playback device is configured to operate in a manner the same as or similar to the group coordinator 704 (FIG. 7) described herein.

In some embodiments, an individual packet of the first stream transmitted from the source device via the first wireless channel and addressed to the second playback device comprises one or more of (i) a portion of media content and (ii) a sequence identifier and/or a timestamp corresponding to the portion of media content. And in some embodiments, an individual packet of the second stream transmitted from the second playback device via the second wireless channel and addressed to the broadcast group comprises one or more of (i) a portion of media content, (ii) a sequence identifier and/or timestamp corresponding to the portion of media content, and (iii) playback timing corresponding to the sequence identifier.

In some embodiments, the first stream comprises an A2DP stream transmitted via the first wireless channel, and the second stream comprises a CSB broadcast stream transmitted via the second wireless channel. However, the first and second streams can be any streaming protocol disclosed herein, or any other streaming protocol suitable for media content now known or later developed.

In some embodiments, selectively receiving and/or processing packets received via one of two streams of packets comprising media content in step 802 includes: (i) while receiving packets via the first stream, determining whether the playback device either (a) failed to receive one or more packets via the first stream or (b) received one or more errored or otherwise corrupted packets via the first stream; and (ii) in response to determining that the playback device either failed to receive one or more packets via the first stream or received one or more errored or otherwise corrupted packets via the first stream, the playback device activating a radio to receive (and perhaps also receiving) the missing or corrupted/errored packets via the second stream.

In some embodiments, selectively receiving and/or processing packets received via one of two streams of packets comprising media content in step 802 additionally or alternatively includes: (i) comparing a quality metric for the first wireless channel with the quality metric for the second wireless channel; (ii) in response to determining that the quality metric for the first wireless channel is better than the quality metric for the second wireless channel, choosing to receive and/or process (and perhaps also receiving and processing) packets received from the source device via the first wireless channel and addressed to the second playback device; and (iii) in response to determining that the quality metric for the second wireless channel is better than the quality for the first wireless channel, choosing to receive and/or process (and perhaps also receiving and processing) packets received from the second playback device via the second wireless channel and addressed to the broadcast group.

In some embodiments, the quality metric is at least one of (i) a wireless SNR (Signal-to-Noise Ratio), (ii) a receive power at the first playback device, (iii) a BER (Bit Error Rate) or Packet Error Rate (PER), (iv) a transmission rate, (v) a RSSI (Received Signal Strength Indication), (vi) SINR (Signal-to-Interference-plus-Noise Ratio), and (vii) a PDR (Packet-Delivery Ratio). However other quality metrics for assessing the quality of a wireless transmission link now known or later developed could be used as well.

In some embodiments, selectively receiving and/or processing packets received via one of two streams of packets comprising media content in step 802 includes: (i) storing data received via the first stream in a first buffer; (ii) storing data received via the second stream in a second buffer; (iii)

comparing a quality metric for the first wireless channel with the quality metric for the second wireless channel; (iii) in response to determining that the quality metric for the first wireless channel is better than the quality metric for the second wireless channel, processing data stored in the first buffer; and (iv) in response to determining that the quality metric for the second wireless channel is better than the quality for the first wireless channel, processing data stored in the second buffer. Some embodiments additionally include notifying the sender of the second stream of one or more of (i) which wireless channel of the first and second wireless channels has a better quality metric, and/or (ii) which buffer of the first and second buffers data is being processed from.

Next, method 800 advances to step 804, which includes coordinating playback of the media content in synchrony with one or more other playback devices via control messages exchanged with the second playback device via a third wireless channel.

In some embodiments, the control messages exchanged with the second playback device via the third wireless channel comprise one or more of (i) clock information of the second playback device and (ii) playback timing corresponding to individual sequence identifiers and/or timestamps, wherein an individual sequence identifier and/or timestamp corresponds to a portion of media content. In some embodiments, the third wireless channel comprises a Bluetooth Classic or Bluetooth Low Energy (BLE) link. However, other wireless links suitable for exchanging signaling data between wireless devices now known or later developed could be used instead.

In some embodiments, method 800 additionally includes determining a timing offset between a local clock at the first playback device and the clock information of the second playback device.

In some embodiments, coordinating playback of the media content in synchrony with one or more other playback devices via the control messages exchanged with the second playback device via the third wireless channel in step 804 comprises, for an individual packet comprising media content: (i) extracting a portion of the media content from the individual packet, wherein the individual packet is received via one of (i-a) the first stream transmitted from the source device via the first wireless channel and addressed to the second playback device, or (i-b) the second stream transmitted from the second playback device via the second wireless channel and addressed to the broadcast group comprising the first playback device; (ii) creating an adjusted playback time for the media content within the individual packet by adjusting a playback time for the media content based on the timing offset, wherein the playback time is one of (ii-a) received via the control messages exchanged with the second playback device via the third wireless channel or (ii-b) contained within the individual packet received via the second wireless channel; and (iii) playing the portion of media content extracted from the individual packet when a local clock at the first playback device reaches the adjusted playback time.

VIII. Conclusion

The above discussions relating to playback devices, controller devices, playback zone configurations, and media/audio content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A first playback device comprising:
one or more processors; and
at least one tangible, non-transitory computer-readable medium comprising program instructions that are executable by the one or more processors such that the first playback device is configured to:
after receiving one or more indications that the first playback device will operate as a group coordinator for a group comprising the first playback device and at least a second playback device, transmit configuration information to at least the second playback device comprising: (i) one or more channel configuration details for a first wireless channel via which the first playback device is to receive a first stream of packets addressed to the first playback device, and (ii) one or more channel configuration details for a second wireless channel via which the first playback device is to transmit a second stream of packets addressed to the group comprising at least the second playback device, wherein at least one of the first stream of packets or the second stream of packets comprises media content; and coordinate playback of the media content in synchrony by the group via control messages exchanged with at least the second playback device.

2. The first playback device of claim 1, wherein the program instructions further comprise program instructions that are executable by the one or more processors such that the first playback device is configured to:

generate the second stream of packets comprising the media content; and transmit the second stream of packets comprising the media content to the group comprising at least the second playback device.

3. The first playback device of claim 1, wherein the one or more channel configuration details for the first wireless channel via which the first playback device is to receive the first stream of packets addressed to the first playback device comprises one or more of (i) a channel or link identifier, (ii) a frequency hopping sequence for the channel or link, or (iii) a security key to decode transmissions.

4. The first playback device of claim 1, wherein the one or more channel configuration details for the first wireless channel via which the first playback device is to receive the first stream of packets addressed to the first playback device comprises information about an Advanced Audio Distribution Profile (A2DP) Bluetooth link between the first playback device and a source device.

5. The first playback device of claim 1, wherein the one or more channel configuration details for the second wireless channel via which the first playback device is to transmit the second stream of packets addressed to the group comprising at least the second playback device comprises one or more of (i) a channel or link identifier, (ii) a frequency hopping sequence for the channel or link, or (iii) a security key to decode transmissions.

6. The first playback device of claim 1, wherein the one or more channel configuration details for the second wireless channel via which the first playback device is to transmit the second stream of packets addressed to the group comprising at least the second playback device comprises information about Connectionless Slave Broadcast (CSB) Bluetooth transmissions from the first playback device to the group comprising at least the second playback device.

7. The first playback device of claim 1, wherein an individual packet of the first stream of packets received via the first wireless channel and addressed to the first playback device comprises one or more of (i) a portion of the media content and (ii) a sequence identifier corresponding to the portion of the media content in the individual packet.

8. The first playback device of claim 1, wherein an individual packet of the second stream of packets transmitted from the first playback device via the second wireless channel and addressed to the group comprise one or more of (i) a portion of the media content, (ii) a sequence identifier corresponding to the portion of the media content in the individual packet, and (iii) playback timing corresponding to the sequence identifier.

9. The first playback device of claim 1, wherein the control messages exchanged with at least the second playback device comprise one or more of (i) clock information of the first playback device and (ii) playback timing corresponding to individual sequence identifiers, wherein an individual sequence identifier corresponds to a portion of the media content.

10. The first playback device of claim 1, wherein the first stream of packets comprises an Advanced Audio Distribution Profile (A2DP) stream received via the first wireless channel, wherein the second stream of packets comprises a Connectionless Slave Broadcast (CSB) stream transmitted via the second wireless channel, wherein the control messages exchanged with at least the second playback device comprise control messages exchanged via a third wireless channel, and wherein the third wireless channel is one of a Bluetooth Classic or Bluetooth Low Energy (BLE) link.

11. A tangible, non-transitory computer-readable medium comprising program instructions that are executable by one or more processors such that a first playback device is configured to perform functions comprising:

after receiving one or more indications that the first playback device will operate as a group coordinator for a group comprising the first playback device and at least a second playback device, transmitting configuration information to at least the second playback device comprising: (i) one or more channel configuration details for a first wireless channel via which the first playback device is to receive a first stream of packets addressed to the first playback device, and (ii) one or more channel configuration details for a second wireless channel via which the first playback device is to transmit a second stream of packets addressed to the group comprising at least the second playback device, wherein at least one of the first stream of packets or the second stream of packets comprises media content; and coordinating playback of the media content in synchrony by the group via control messages exchanged with at least the second playback device.

12. The tangible, non-transitory computer-readable medium of claim 11, wherein functions further comprise:

generating the second stream of packets comprising the media content; and transmitting the second stream of packets comprising the media content to the group comprising at least the second playback device.

13. The tangible, non-transitory computer-readable medium of claim 11, wherein the one or more channel configuration details for the first wireless channel via which the first playback device is to receive the first stream of packets addressed to the first playback device comprises one or more of (i) a channel or link identifier, (ii) a frequency hopping sequence for the channel or link, or (iii) a security key to decode transmissions.

14. The tangible, non-transitory computer-readable medium of claim 11, wherein the one or more channel configuration details for the first wireless channel via which the first playback device is to receive the first stream of packets addressed to the first playback device comprises information about an Advanced Audio Distribution Profile (A2DP) Bluetooth link between the first playback device and a source device.

15. The tangible, non-transitory computer-readable medium of claim 11, wherein the one or more channel configuration details for the second wireless channel via which the first playback device is to transmit the second stream of packets addressed to the group comprising at least the second playback device comprises one or more of (i) a channel or link identifier, (ii) a frequency hopping sequence for the channel or link, or (iii) a security key to decode transmissions.

16. The tangible, non-transitory computer-readable medium of claim 11, wherein the one or more channel configuration details for the second wireless channel via which the first playback device is to transmit the second stream of packets addressed to the group comprising at least the second playback device comprises information about Connectionless Slave Broadcast (CSB) Bluetooth transmissions from the first playback device to the group comprising at least the second playback device.

17. The tangible, non-transitory computer-readable medium of claim 11, wherein an individual packet of the first stream of packets received via the first wireless channel and addressed to the first playback device comprises one or more of (i) a portion of the media content and (ii) a sequence identifier corresponding to the portion of the media content in the individual packet.

18. The tangible, non-transitory computer-readable medium of claim 11, wherein an individual packet of the second stream of packets transmitted from the first playback device via the second wireless channel and addressed to the group comprise one or more of (i) a portion of the media content, (ii) a sequence identifier corresponding to the portion of the media content in the individual packet, and (iii) playback timing corresponding to the sequence identifier.

19. The tangible, non-transitory computer-readable medium of claim 11, wherein the control messages exchanged with at least the second playback device comprise one or more of (i) clock information of the first playback device and (ii) playback timing corresponding to individual sequence identifiers, wherein an individual sequence identifier corresponds to a portion of the media content.

20. The tangible, non-transitory computer-readable medium of claim 11, wherein the first stream of packets comprises an Advanced Audio Distribution Profile (A2DP) stream received via the first wireless channel, wherein the second stream of packets comprises a Connectionless Slave Broadcast (CSB) stream transmitted via the second wireless channel, wherein the control messages exchanged with at least the second playback device comprise control messages exchanged via a third wireless channel, and wherein the third wireless channel is one of a Bluetooth Classic or Bluetooth Low Energy (BLE) link.

\* \* \* \* \*